United States Patent [19]

Yamada et al.

[11] Patent Number: 5,331,419
[45] Date of Patent: Jul. 19, 1994

[54] SIZE DISPLAY SYSTEM FOR ELECTRONIC CAMERA

[75] Inventors: Tsukasa Yamada, Zama; Hiromasa Hino, Akishima; Shoji Watanabe, Yokosuka; Shin Yasuhara, Kawasaki, all of Japan

[73] Assignee: Kyocera Corporation, Kyoto, Japan

[21] Appl. No.: 857,752

[22] Filed: Mar. 26, 1992

[30] Foreign Application Priority Data

| Mar. 26, 1991 | [JP] | Japan | 3-86327 |
| Apr. 22, 1991 | [JP] | Japan | 3-116513 |
| Apr. 25, 1991 | [JP] | Japan | 3-121787 |
| May 15, 1991 | [JP] | Japan | 3-139611 |
| Jul. 19, 1991 | [JP] | Japan | 3-203174 |

[51] Int. Cl.$^5$ .......................... H04N 5/30; H04N 7/18
[52] U.S. Cl. ............................... 348/64; 348/137; 348/334
[58] Field of Search .................... 358/107, 209

[56] References Cited

U.S. PATENT DOCUMENTS

| 4,207,594 | 6/1980 | Morris et al. | 358/107 |
| 4,396,944 | 8/1983 | McKenney | 358/107 |
| 4,980,763 | 12/1990 | Lia | 358/98 |

Primary Examiner—Michael T. Razavi
Assistant Examiner—Bipin Shalwala
Attorney, Agent, or Firm—Spensley Horn Jubas & Lubitz

[57] ABSTRACT

An electronic camera is provided which, in photographing, obtains size information about an object, generates the size information, or size data calculated through arithmetic operation, or a scale pattern based on the size data, and records the scale pattern on a recording medium in the same recording area as an object image or in a separate area made correspondent to a recording area for the object image, and which, when size display is instructed during photographing or in reproduction, displays a scale (including a pattern representing the scale, indications representing the scale by characters and/or figures such as graduation numerals, and color-coded indications representing the scale) together with the object image on the same screen. The object image is taken in from image sensing system means and, when a size display mode is instructed, processing means simultaneously calculates the size data based on the size information obtained from the image sensing system means and range measuring means for generating the scale pattern. The arithmetic operation and generation of the scale pattern may be performed on the reproduction side. The scale pattern, etc. are recorded on a recording medium (including the analog recording type and the digital recording type) together with the object image in the predetermined recording areas. In reproduction, when size display is instructed, the scale is synthesized with the object image to be output to a TV monitor or the like.

10 Claims, 17 Drawing Sheets 122 (GRADUATIONS)  120 (SCALE PATTERN)

———— 1m
←———→ 1cm
←———→ 1mm
———— 1m
⌐———⌐ 1μm
 10cm

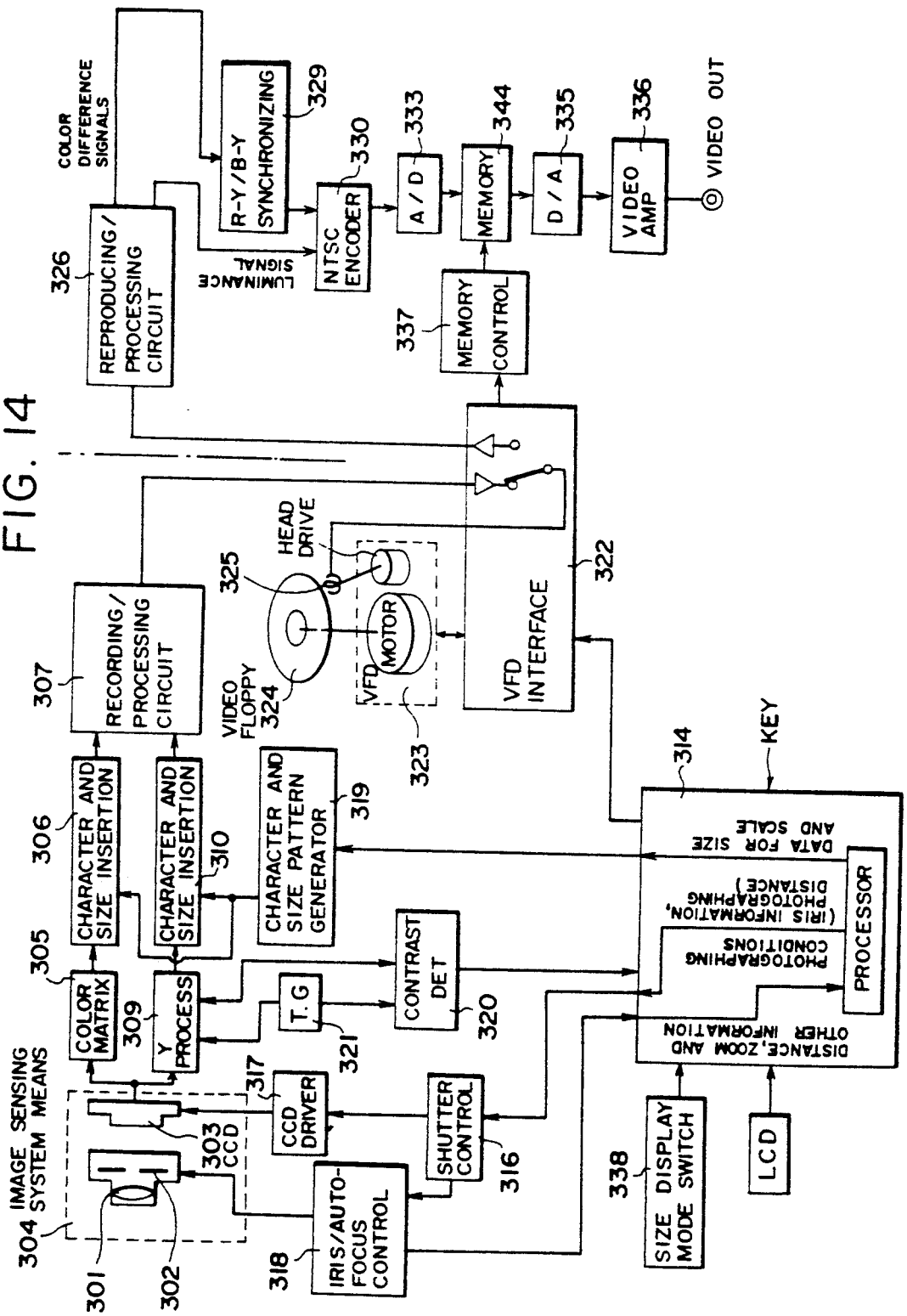

SCREEN SIZE (inch)
N = 0.8M

SIZE DISPLAY SYSTEM FOR ELECTRONIC CAMERA

BACKGROUND OF THE INVENTION

1. Field of the Invention

The present invention relates to a size display system for an electronic camera which can obtain and record size information about an object to be photographed when taking a photograph, and can provide size as display as well as an object image for clarifying dimensions of the subject during photographing or reproduction.

To begin with, the term "electronic camera" used in this specification is defined as including electronic still cameras and video movie cameras (video cameras) such as VTRs integral with cameras. Also, the term "size information" is defined as including information necessary to calculate the size, such as in-focus information (information indicating an in-focus condition), zoom information (information indicating magnifications of a lens), distance information (distance up to an object), iris information (aperture value), and position information (position of a measured point in a frame or screen). Further, the term "scale pattern" is defined as including numerals, characters and figures such as scales, scale factors and unit symbols.

2. Prior Art

Some of TV monitors and the like have a system for displaying ID information as well as the image, when an object image photographed by an electronic still camera is reproduced. The ID information comprises identification for storage of field and frame, track number, date (year, month and day), time (hour, minute and second), user's area, etc.

That type prior electronic still camera capable of recording ID information incorporates only a circuit for recording the object image and the ID information.

Meanwhile, application fields of electronic still cameras have been remarkably widened in recent years. With such widespread use, there arises a demand, for example, to easily and accurately know the size and length of the photographed object image on the display screen.

However, conventional electronic still camera cannot meet such a demand because they only have the above-mentioned data display system at most.

At the present state, the purpose of accurately knowing the object size is achieved by simultaneously photographing, for example, a pencil or a cigarette which is suitable to compare the object in size.

Since the user's area in the ID information is freely available, it may be conceivable to utilize the user's area for that purpose. In practice, however, the user's area is only enough to indicate alphabet letters as many as about ten digits.

As an alternative for giving an indication during the photographing operation, there is also known a system of indicating distance information (Japanese Patent Laid-Open No. 1-309472).

This known system is to indicate the distance up to an object within an electronic viewfinder in the form of numerical value, but not to display dimensions and/or size of the object.

In the field of cameras using silver salt films, there has been proposed a scale-fitted camera for imprinting a scale in a print image on the film by LED, LCD or the like (Japanese Patent Laid-Open No. 63-155042).

However, that scale-fitted camera has no choice on whether or not to indicate the scale. In other words, the scale can no longer be erased once imprinted. Also, that scale-fitted camera does not include means (such as a circuit and a recording medium) for storing data necessary to indicate the scale. Moreover, the shape of the scale imprinted by LED, LCD or the like is fixedly determined with no possibility of, for example, rearranging the relationship between the scale and the print image for making it easier to see.

As mentioned above, no prior art has been found that can selectively display dimensions and/or length of a photographed object image, and enables easy and accurate comparison of the object image with a reference scale.

With a view of realizing a size display system for an electronic camera which can meet the above demand, it should be considered to prepare a region in which size information, a scale pattern or the like can be recorded without reducing the number of photograph frames available in a recording medium as far as possible.

For the purpose of more precisely knowing the size of an object, it is also required to increase accuracy of a scale which can be selectively inserted into an object image.

It is further desirable to easily and accurately know the distance between two arbitrary points on one or two objects to be measured, and sharply display those two measured points in the reproduced image of each object.

Meanwhile, in the case of conducting a presentation of commodities, there has been conventionally adopted a method of photographing an object by cameras using silver salt films and producing a paper print.

In this method of utilizing paper prints, a variety of techniques are employed to indicate dimensions of a printed object. For example, a scale is inserted into part of the photograph so that one may know the actual size of the object. Practically, a rule or any other well-known substance such as a cigarette case is photographed along with the object.

While the above method is adopted in the case of informing dimensions of commodities, a full-size enlargement of photographs is most effective to indicate the commodity dimensions.

However, the following various problems have been experienced in presenting a full-size indication by utilizing the silver salt photography.

(1) Problem of print size: At present, usual photographs are printed into the size of approximately 8 cm×12 cm, called service size. Use of this print size imposes limitations on what can be indicated by full-size photographs. It is of course possible to specify the print size other than the service size. But, use of the other print size is not practical because of being expensive and taking an extended print time.

(2) Problem of setting scale factor in printing: Even with photographs similarly called service size, they are different in the actual print size depending on types of printers used. Further, prints are enlarged by trimming part of the original negative film in many cases and the region subjected to the trimming is also different depending on types of printers used, making it difficult to evenly set a scale factor in the printing operation. (3) Problem in photographing: Usual cameras do not indicate what photographing scale factor (that is herein used to imply dimensions of a focused image relative to an actual object) is employed in the photographing operation. Only some macrolenses for single-lens reflex cameras bear photographing scale factors indicated thereon.

SUMMARY OF THE INVENTION

A first object of the present invention is to provide a size display system for an electronic camera which can display a size pattern as well as an object image during reproduction when a size display mode is selected, for enabling the user to easily and accurately know dimensions of an object.

A second object of the present invention is to provide a size display system for an electronic still camera capable of simultaneously displaying a photographed object image and a size pattern on a screen, the size display system being arranged such that a special region other than the region of a recording medium used to record an image signal is utilized as a region for storing size information so that the number of photograph frames storable in the recording medium will not be reduced and the ID information region may be used as it is.

A third object of the present invention is to provide a size display system for an electronic camera capable of simultaneously displaying a photographed object image and a size pattern on a screen, the size display system being arranged such that measurement accuracy of distance information taken in during photographing is increased to improve accuracy of a scale pattern displayed along with the object image.

A fourth object of the present invention is to provide a size display system for an electronic camera in which the size between two arbitrary points on one or two objects under measurement captured in the visual field of a finder and a scale pattern spanning therebetween can be displayed simultaneously with an object image in the finder (during photographing) and on the reproduced screen of the photographed image, and photographing conditions are automatically set so as to sharply indicate the two measured points during photographing in a size display mode.

A fifth object of the present invention is to provide a size display system for an electronic camera in which, when the reproduced screen image is output, a scale factor of the output image relative to the actual object can be displayed and the reproduced image can be adjusted to a desired scale factor.

To achieve the above first object, a size display system for an electronic camera according to the present invention comprises image sensing system means for converting an image of an object focused on an image sensor through a lens system into an image signal; focusing control means for obtaining lens information such as zoom information and size information such as distance information in a state that the object image focused on said image sensor is under an in-focus condition; size display pattern generating means for taking in the lens information such as zoom information and the size information such as distance information obtained from said focusing control means, making arithmetic operations to calculate size display data, and generating a size display pattern based on said size display data; and means for inserting said size display pattern into the object image.

Also to achieve the above first object, a size display system for an electronic camera according to the present invention comprises image sensing system means for converting an image of an object focused on an image sensor through a lens system into an image signal; focusing control means for obtaining zoom information and distance information in a state that the object image focused on said image sensor is under an in-focus condition; a size display pattern generating circuit; a size display inserting circuit for inserting an output of said size display pattern generating circuit as an image signal; control means for, in photographing, taking in the zoom information and the distance information obtained from said focusing control means, performing arithmetic operations to calculate size display data, outputting a size display pattern from said size display pattern generating circuit based on said size display data to thereby create an image signal of only the size display pattern to be recorded on a recording medium, and making correspondence between a recording area of said recording medium where said image signal of only the size display pattern is recorded and a recording area of said recording medium where said image signal of the object is recorded; and synthesis means for synthesizing images in plural recording areas of said recording medium with each other, wherein in reproducing the object image on a monitor or the like from said recording medium, the object image and the corresponding size display pattern can be synthesized and displayed.

To achieve the above second object, a size display system for an electronic still camera according to the present invention comprises image sensing system means for converting an image of an object focused on an image sensor through a lens system into an image signal; lens and iris control means for obtaining in-focus information, zoom information, distance information and iris information about the object image focused on said image sensor; NRZ writing means for making conversion into an NRZ signal; a recording medium having a special region where a signal other than said image signal of the object is stored by being recorded with an NRZ recording technique; an NRZ reading circuit for making inverse conversion of the NRZ signal; select means for selecting whether size display is to be made or not; a scale display circuit for generating a scale pattern and numerical values for graduations; and control means having a function of calculating size display data based on said in-focus information, zoom information, distance information and iris information, causing said in-focus information, zoom information, distance information and iris information or said size display data to be NRZ-converted by said NRZ writing means and recorded in the special region of said recording medium in photographing, and causing the contents of the special region of said recording medium to be read out and demodulated into the original signal format by said NRZ reading circuit in reproduction when size display is selected by said select means, whereby said size display data are sent to said scale display circuit to output the scale pattern and the numerical values for graduations therefrom so that the scale pattern and the numerical values for graduations are displayed on a screen reproducing said image signal of the object read from the said recording medium in a superposed relation.

Also to achieve the above second object, a size display system for an electronic still camera according to the present invention comprises image sensing system means for converting an image of an object focused on an image sensor through a lens system into an image signal; lens and iris control means for obtaining in-focus information, zoom information, distance information and iris information about the object image focused on said image sensor; NRZ writing means for making conversion into an NRZ signal; a recording medium having a special region where a signal other than said image signal of the object is stored by being recorded with an NRZ recording technique; an NRZ reading circuit for making inverse conversion of the NRZ signal; select means for selecting whether size display is to be made or not; a scale display circuit for generating a scale pattern and numerical values for graduations; and control means having a function of calculating size display data based on said in-focus information, zoom information, distance information and iris information, causing said size display data to be calculated based on said in-focus information, zoom information, distance information and iris information and also causing said scale display circuit to generate the scale pattern and the numerical values for graduations in photographing, so that the scale pattern and the numerical values for graduations are NRZ-converted by said NRZ writing means and recorded in the special region of said recording medium, and causing the contents of the special region of said recording medium to be read out and demodulated into the original signal format by said NRZ reading circuit in reproduction when size display is selected by said select means, whereby the scale pattern and the numerical values for graduations are output so that the scale pattern and the numerical values for graduations are displayed on a reproduced screen of said image signal of the object read from the said recording medium in a superposed relation.

To achieve the above third object, a size display system for an electronic camera according to the present invention is arranged such that in-focus information, zoom information, distance information and iris information about an image of an object focused on an image sensor through a lens system are obtained to calculate size display data for displaying a scale pattern based on said calculated data together with the object image, the size display system comprising scale mode setting means; AF range measuring area specifying means for specifying an AF range measuring area; scale mode condition setting means for moving a zoom lens to a tele end, causing said AF range measuring area specifying means to make the AF range measuring area narrower than the range measuring area in normal photographing, and setting an iris to the full-open side, when the camera is set to a scale mode by said scale mode setting means; and control means for, when focusing operation is performed in a state of the scale mode being set, fixing a lens position to the in-focus position, making a shift to a photographing mode, and setting an iris to an auto-iris state and a zoom lens to a manually operable state, wherein the distance information among various kinds of information taken in during shutter release operation after setting the scale mode and performing the focusing operation is given by taking in information standing for the lens position at the time when fixed to said in-focus position.

To achieve the above fourth object, a size display system for an electronic camera according to the present invention comprises image sensing system means for converting an image of an object focused on an image sensor through a lens system into an image signal; focusing control means for obtaining zoom information and distance information in a state that the object image focused on said image sensor is under an in-focus condition; means for detecting positions of two measured points, captured in the same visual field, on a screen; character and size pattern generating means; character and size pattern inserting means for inserting an output of said character and size pattern generating means as an image signal; control means for obtaining distances up to said two measured points based on the distance information from said focusing control means to calculate the difference between those distances to thereby determine the distance between said two measured points, and calculating size display data based on the positions of said two measured points on the screen, the distance information and zoom information for generating a size pattern between said two measured points, and sending the distance between said two measured points and the size display data to said character and size pattern generating means so that a numerical value indicating said distance, a unit and a size pattern signal are output from said character and size pattern generating means and recorded on a recording medium by said character and size pattern inserting means; and means for synthesizing said image signal of the object read out from said recording medium with the numerical value indicating said distance, the unit and the size pattern, wherein when size display is instructed, the numerical value indicating said distance, the unit and the size pattern are displayed on a reproduced screen of the object.

Also to achieve the above fourth object, a size display system for an electronic camera according to the present invention is arranged such that position information of two measured points on one or two objects captured in the same visual field, and zoom information and distance information in a state that the measured points are under an in-focus condition, are obtained from a zoom lens and a focus adjusting lens; said various kinds of information are put in predetermined equations and subjected to arithmetic operation to calculate data for the size between said two measured points and a scale indicating the span therebetween; said data for the size and the scale are sent to a scale pattern generator to output a numerical value indicating said size, a unit and a scale pattern; and the numerical value indicating said size, the unit and the scale pattern are displayed simultaneously with an object image during photographing or when a photographed image is reproduced, said size display system comprising control means for, when said two measured points on one or two objects are specified in a state of a size display mode being set, calculating said data for the size and the scale based on the position information as well as the zoom information and the distance information under an in-focus condition which are obtained for each of said two measured points, narrowing an aperture of an iris as small as possible in consideration of the relation of a shutter speed with respect to an EV value of the object, calculating a square root of the product of the distances up to said two measured points to determine the photographing distance, and performing a focus adjustment of said focus adjusting lens so that the focal length of the focus adjusting lens becomes equal to the photographing distance.

To achieve the above fifth object, a size display system for an electronic camera according to the present invention comprises an electronic camera comprised of image sensing system means for converting an image of an object focused on an image sensor through a lens system into an image signal, lens drive system means for obtaining zoom information and distance information of the object image focused on said image sensor, and control means for recording the information obtained from said lens drive system means on a recording medium together with said image signal of the object; and an output unit for reading the information obtained from said lens drive system means together with said image signal of the object out of said recording medium, calculating a scale factor of a reproduced screen relative to the object based on said information and reproduced screen size information of said output unit, and displaying the calculated scale factor on the reproduced screen.

Also to achieve the fifth object, a size display system for an electronic camera according to the present invention comprises, in addition to the above arrangement, means for entering a scale factor to said output unit, wherein when said scale factor is entered, the reproduced screen size is changed to set the reproduced screen at the entered scale factor.

BRIEF DESCRIPTION OF THE DRAWINGS

FIG. 14 is a circuit block diagram showing the fifth embodiment of a size display system for an electronic camera according to the present invention.

DETAILED DESCRIPTION OF PREFERRED EMBODIMENTS

Figure 1:
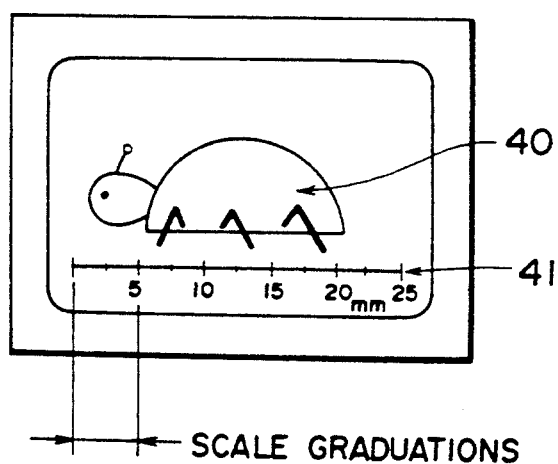
FIG. 1 is a diagram showing a display example of a size display system according to a first embodiment of the present invention.

FIG. 1 is a diagram showing one example of a monitor screen displaying a scale in a first embodiment of the present invention.

An object 40 is reproduced in the center of a screen and a scale (including numeral values of graduations along with a scale pattern) 41 is displayed, as one example of size display, in the lower side of the screen. The scale graduations are determined in size based on in-focus information, etc. and the scale pattern is displayed depending on the determined size.

From comparison with the scale 41, dimensions of the object can be known easily and accurately.

Figure 2:
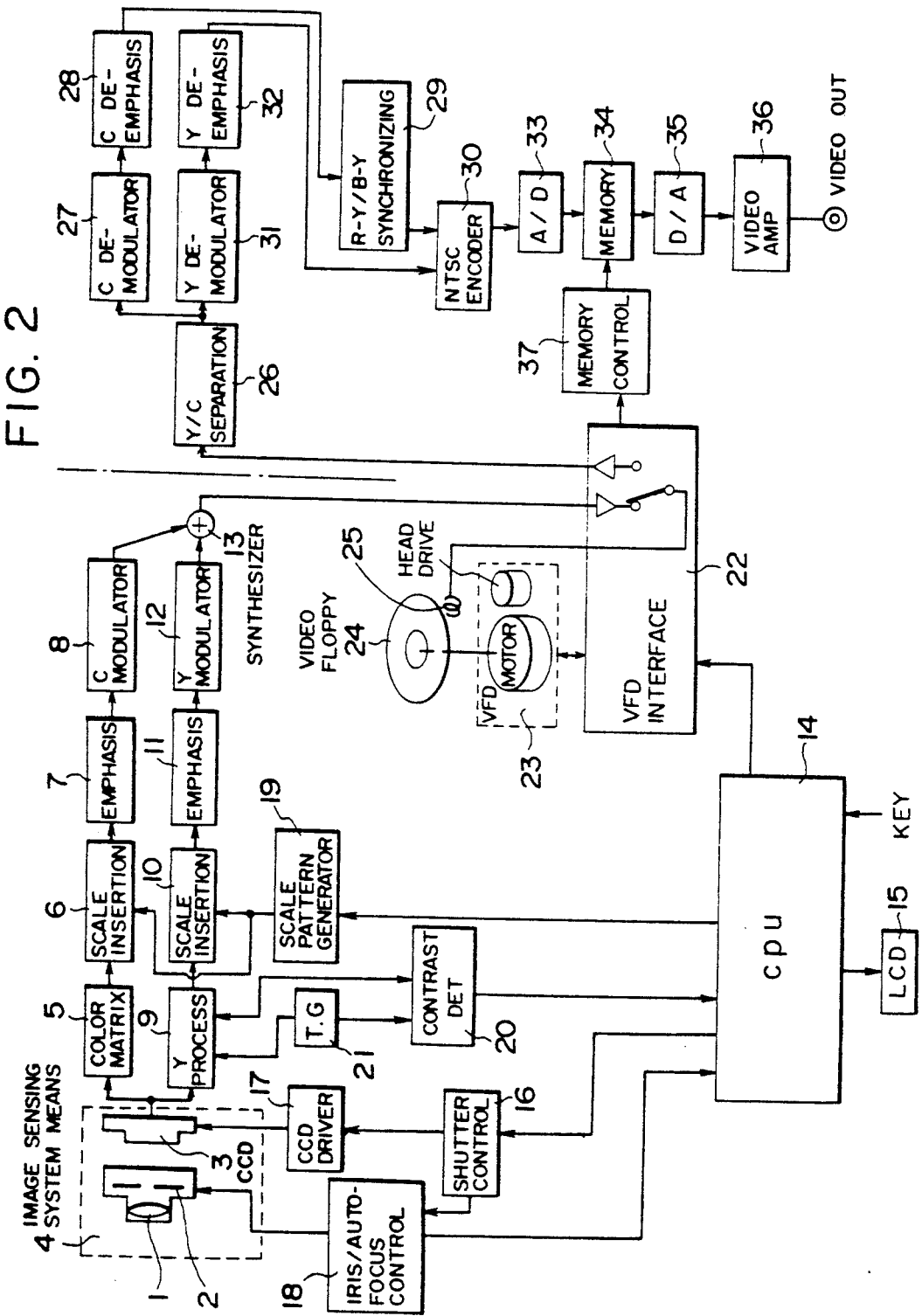
FIG. 2 is a circuit block diagram showing the first embodiment of a size display system for an electronic camera according to the present invention.

FIG. 2 is a circuit block diagram showing the first embodiment of a size display system for an electronic camera according to the present invention.

Image sensing system means 4 comprises a lens system 1, an iris (diaphragm) 2, a CCD image sensor 3, and so forth.

The lens system 1 comprises a master lens, a focus adjusting lens, a magnification changing lens (i.e., a zoom lens), etc. and includes the iris 2 therein.

An iris/auto-focus control circuit 18 including in-focus control means comprises a drive unit for driving the focus adjusting lens and the zoom lens of the lens system 1, a drive unit for driving the iris, and a control unit for controlling these drive units.

A control signal is sent to the iris/auto-focus control circuit 18 from a CPU (control means) 14 via a shutter control circuit 16.

When the CPU 14 actuates the CCD driver 17 via the shutter control circuit 16 to drive the CCD image sensor 3, an image of the object is taken into a recording system circuitry via the image sensing system means 4 and is displayed in an electronic finder (not shown).

Besides the above operation, the iris/auto-focus control circuit 18 drives the focus adjusting lens to perform the focusing operation based on a high-frequency signal taken out of the image signal. During the focusing operation and under the in-focus condition, information indicating the position of the focus adjusting lens (i.e., distance information) is sent to the CPU 14.

Further, when a signal indicating the zooming operation being actuated is input from the CPU 14, the zoom lens is driven to enlarge or reduce the object image into the desired dimensions.

Zoom lens position information, i.e., zoom information in that case, is also sent to the CPU 14.

Additionally, the iris/auto-focus control circuit 18 receives information of brightness from the image signal and makes a control so that the iris 2 is controllably driven to give the object the proper extent of exposure.

Upon receiving a shutter operation signal, the CPU 14 sends a control signal to the shutter control circuit 16. The shutter control circuit 16 operates the CCD driver 17 so that the electric charges so far accumulated in the CCD image sensor 3 are expelled out to start transfer of the electric charges, followed by ending the charge transfer after a predetermined period of time (i.e., a shutter release time).

The CCD image sensor 3 sends an electric signal of the object image to the recording system circuitry.

In the recording system circuitry, the electric signal from the CCD image sensor 3 is input to a color matrix circuit 5 and a Y process circuit 9. The color matrix circuit 5 performs subtraction between a Y (luminance) signal and chroma signals to thereby output color difference signals.

On the other hand, the Y process circuit 9 inserts a synch signal, etc. using a timing pulse from a timing generator 21 to thereby create a predetermined luminance signal.

Part of an output of the Y process circuit 9 is sent to a contrast detecting unit 20. At the timing of a pulse supplied from the timing generator 21, the contrast detecting unit 20 detects brightness of the luminance signal and sends the detected information to the CPU 14.

The CPU 14 analyses the detected information and sends the control signal to the iris/auto-focus control circuit 18 for the above-mentioned exposure control.

A scale insertion circuit 6 is to insert scale information into the color difference signals. Also, a scale insertion circuit 10 is to insert scale information into the luminance signal. These scale insertion circuits 6 and 10 operate only while the scale information is being sent from the scale pattern generator 19. In other words, when the color difference signals and the luminance signal, both making up the object image, are respectively supplied from the color matrix circuit 5 and the Y process circuit 9, no scale information is inserted into those signals. Accordingly, upon photographing one frame, the scale insertion circuits 6 and 10 output the image signal of the object and an image signal representing only the inserted scale information at the timings different from each other.

The scale pattern generator 19 is to generate a pattern signal as shown in FIG. 1. Specifically, the scale pattern generator 19 makes calculations of the zoom information (information about the angle of view) and the distance information under the in-focus condition which are taken in by the CPU 14, and then outputs a size display pattern signal corresponding to dimensions of the object based on the calculated scale data. The size display pattern signal also includes numerals indicating scale graduations, or the like.

The color difference signals and the luminance signal having passed through the scale insertion circuits 6 and 10 are respectively processed by emphasis circuits 7 and 11 so as to emphasize characteristics of high-frequency components of those signals for holding high S/N ratios of the high-frequency components during modulation.

Outputs of the emphasis circuits 7 and 11 are respectively FM-modulated by a C modulator 8 and a Y modulator 12, followed by synthesis in a synthesizer 13. The synthesized signal is recorded by a magnetic head 25 on a predetermined recording track of a video floppy 24.

At this time, the image signal of only the size display pattern is set to be recorded on a track at an even number, whereas the image signal of the object is set to be recorded on a track at an odd number.

The track number for the image of the object and the track number for the image of only the size display pattern are stored in a memory built in the CPU 14 in correspondent relation.

Under control of the CPU 14, a VFD (Video Floppy Disk Drive) interface circuit 22 controllably drives a spindle motor in a VFD 23 for rotating the video floppy 24 at a predetermined speed and phase. Simultaneously, a head drive motor is driven to move the magnetic head 25 on the track of the video floppy 24 instructed by the CPU 14.

An LCD 15 is connected to the CPU 14 to give various kinds of display indicating conditions of the electronic still camera.

Figure 12:
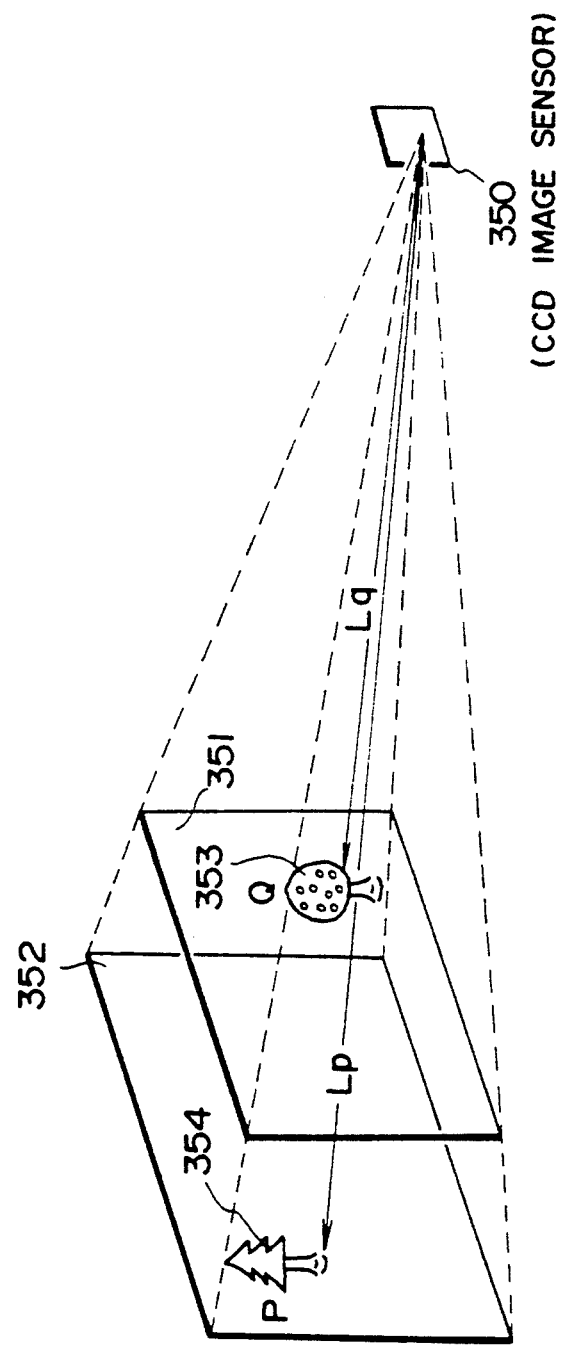
FIG. 12 is a diagram for explaining the principles of how to calculate the distance (size) between two measured points captured in the visual field of a finder, in order to explain a fifth embodiment of a size display system for an electronic camera according to the present invention.

The circuit section on the right side of one-dot-chain line in FIG. 12 represents a reproducing system.

The image signal of the object recorded in the video floppy 24 on the track at a predetermined odd number is read out under control of the CPU 14 and divided by a Y/C separation circuit 26 into a luminance signal modulation wave and a color difference signal modulation wave. The color difference signal modulation wave and the luminance signal modulation wave are respectively demodulated by a C demodulator 27 and a Y demodulator 31. The respective demodulated signals are returned to the original flat characteristics by a C de-emphasis circuit 28 and a Y de-emphasis circuit 32.

The R-Y and B-Y demodulation waves of the color difference signals are synchronized with each other by an R-Y/B-Y synchronizing circuit 29, following which the signals thus synchronized and the signal from the Y de-emphasis circuit 32 are input to an NTSC encoder 30.

The NTSC encoder 30 converts those signals into NTSC signals and sends the converted NTSC signals to an A/D converter 33.

An output of the A/D converter 33 is once stored in an address space of a memory 34 specified by a memory control circuit 37 upon receiving an instruction from the CPU 14.

Here, when the CPU 14 receives via a key entry an instruction to effect size display simultaneously, it reads out the track number information of the even-number track making a set in combination with the predetermined odd-number track from the built-in-memory, and controls the VFD interface circuit 22 to move the magnetic heaD 25 on that even-number track. When the magnetic head 25 is positioned onto that even-number track, the image signal of only the size display pattern is read out.

The image signal thus read out is processed in a like manner to the image signal of the object and converted into a digital signal by the A/D converter 33.

The memory control circuit 37 causes the image signal of only the size display pattern to be stored in an address space of the memory 34 separate from that in which the image signal of the object is stored. Thereafter, both the image signals of the object and the size display pattern are simultaneously read out of the memory 34 by the memory control circuit 37 and synthesized to each other, followed by conversion into an analog signal through a D/A converter 35. The analog signal is amplified by a video amplifier 36 and output from a video output terminal.

Figure 3:
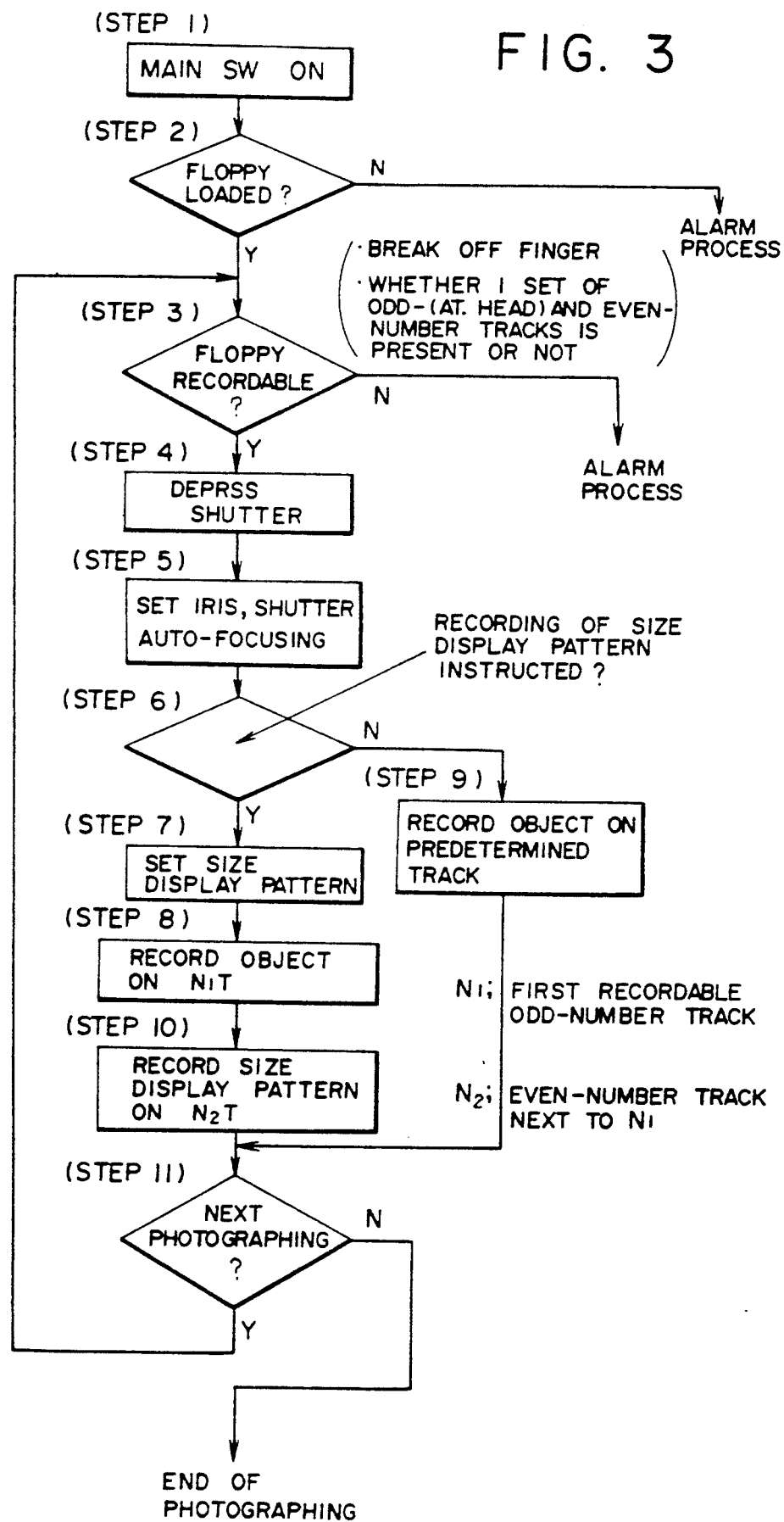
FIG. 3 is a flowchart for explaining the recording operation procedure during photographing in the first embodiment.

FIG. 3 is a flowchart for explaining the photographing operation procedure in FIG. 2.

When a main switch is turned on (step 1), it is determined whether the video floppy is loaded or not (step 2). If the video floppy is not loaded, then the alarm process is performed. If the video floppy is loaded, then it is determined whether the video floppy is recordable or not (step 3). This decision also includes whether one set of odd-number and even-number tracks is present or not.

When a shutter is depressed (step 4), then the iris setting and the focusing operation are performed (step 5), followed by determining whether recording of a size display pattern is instructed or not (step 6). If the recording of a size display pattern is not instructed, then the image signal of the object is recorded on a predetermined recording track (step 9).

If the recording of a size display pattern is instructed, then the distance information and the zoom information such as the in-focus signal are taken in for setting of the size display pattern (step 7).

The image signal of the object is first recorded on a predetermined odd-number track of the video floppy (step 8) and the image signal of the size display pattern is then recorded on a corresponding even-number track thereof (step 10), followed by returning to the step 3 when the photographing is continued (step 11).

Figure 4:
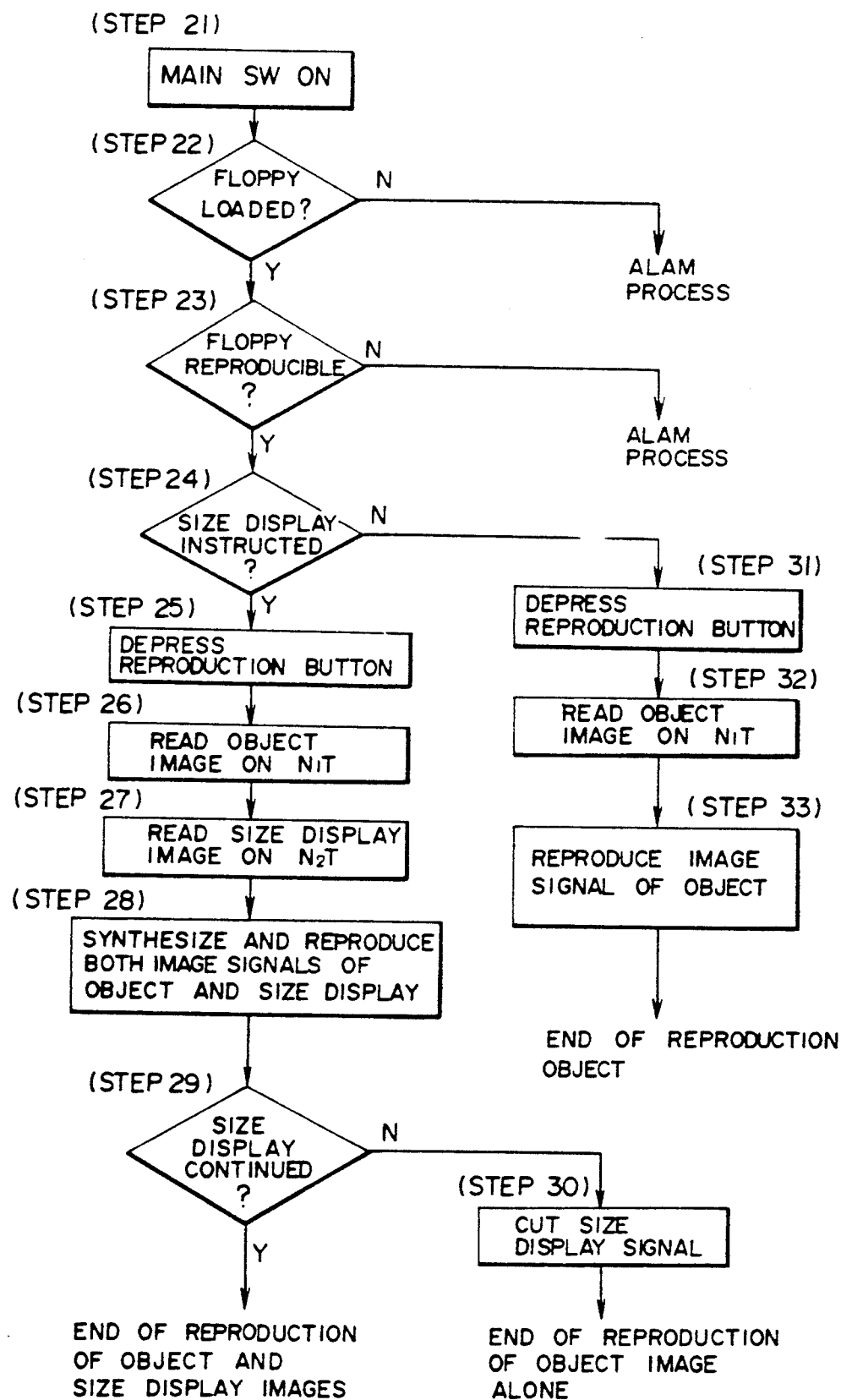
FIG. 4 is a flowchart for explaining the display operation procedure during reproduction in the first embodiment.

FIG. 4 is a flowchart for explaining the reproducing operation procedure in FIG. 2.

Steps 21 and 22 are the same as the steps 1 and 2 in the above flowchart for the recording procedure, respectively. In a step 23, whether the video floppy is reproducible or not is determined.

If reproducible, then it is determined whether size display is to be made or not (step 24). In the case of providing a size display pattern, when a reproduction button is depressed (step 25), the object image is first read out of the selected track (step 26) and the size display image is then read out (step 27). Both the image signals of the object and the size display pattern are stored in the memory 34 to be synthesized and reproduced on the TV monitor (step 28). Subsequently, whether to continue providing the size display pattern or not is determined (step 29). If continued, then reproduction of the object and the size display pattern is ended. If not continued, then only the object image is reproduced on the TV monitor by cutting read-out of the size display image from the memory 34 (step 30).

On the other hand, in the case of an instruction being given not to provide the size display pattern during reproduction, when the reproduction button is depressed (step 31), only the image signal of the object is read out and once stored in the memory 34, followed by reproduction (steps 32, 33).

While the above embodiment is explained as storing the data, which make the odd number of the track recording the object image and the even number of the track recording the size display image correspondent to each other, in the memory built in the CPU, those data indicating the correspondence may be stored in the user's area of ID information (comprised of identification for recording of frame and field, track number, date (year, month and day) and user's area) that is recorded on the track used to record the object image in superposed relation. In this case, even when the video floppy is reproduced by any other electronic still camera, the size display pattern can be simultaneously provided if that electronic still camera has the reproducing system circuitry according to the present invention.

Figure 5:
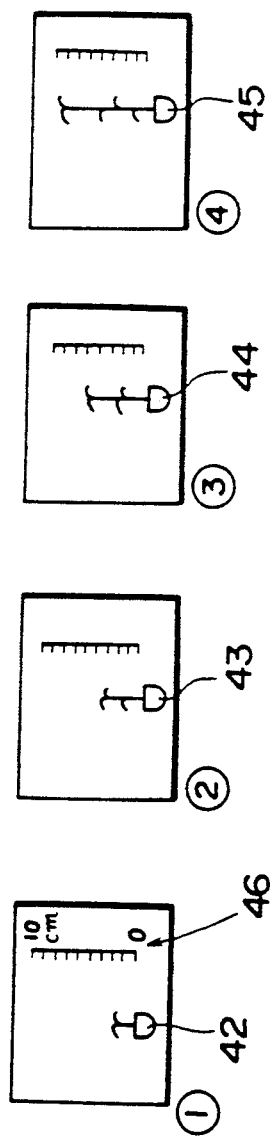
FIG. 5 is a diagram showing examples of a size display screen in a second embodiment of a size display system for an electronic camera according to the present invention.

FIG. 5 is a diagram showing a second embodiment of the present invention in which a track is set to provide one kind of size display for a number of object images.

An object 42 is photographed with intervals of predetermined time to record the successive stages of growth as illustrated by images of objects 42–45. Since only one scale suffices this case, the same scale is used for the respective images.

The images of the objects 42–45 are recorded on tracks 2–5 and the size display image is recorded on a track 1.

At this time, the data which make the track 1 recording the image of the size display pattern and the tracks 2–5 recording the images of the objects 42–45 correspondent to each other are stored in the user's area of the ID information. In reproduction, data in the user's area are read out to obtain the data indicating the correspondence between the track for the size display pattern and the track for the object, based on which the data on the tracks 1 and 2 are first read out to be synthesized and reproduced. After that, the data on the tracks 1 and 3, the data on the tracks 1 and 4, and so forth are successively read out to be synthesized and reproduced.

The recording operation is similar to the procedure of FIG. 3 in the first embodiment, but different therefrom in the procedure of recording the size display image on one track and the object images on four tracks. Also, the procedure of storing the data indicating the correspondence between those tracks in the user's area of the ID information is added.

Figure 6:
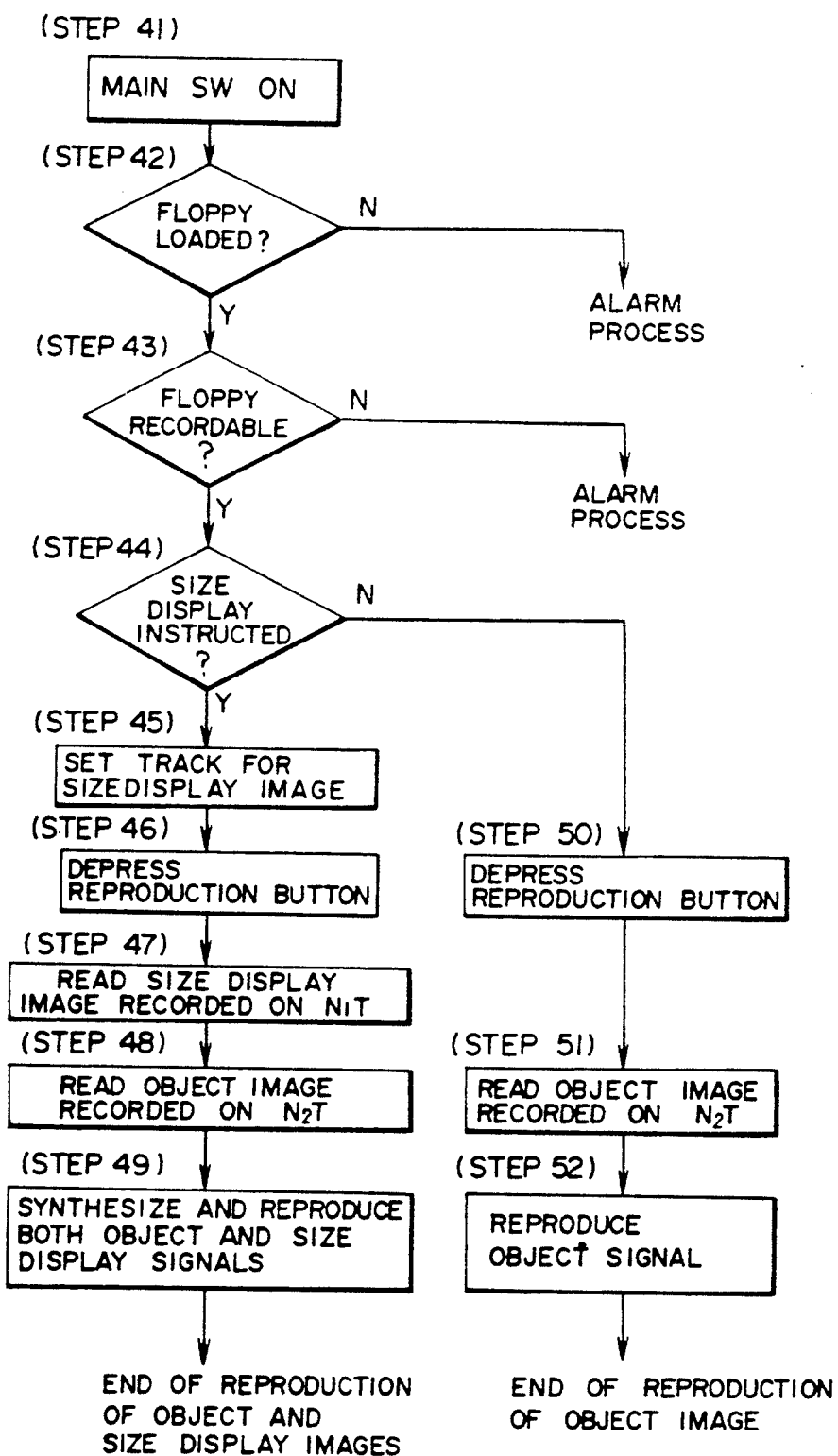
FIG. 6 is a flowchart for explaining the display operation procedure during reproduction in the second embodiment.

FIG. 6 is a flowchart for explaining the reproducing operation procedure in the second embodiment.

Steps 41 to 43 are the same as the steps 21 to 23 in FIG. 4, respectively. In a step 44, whether size display is to be made or not is determined.

As a result, if size display is instructed, then the number of the track recording the size display image made correspondent to the number of the track recording the object image to be reproduced is read out of the user's area of the ID information (step 45). Subsequently, when the reproduction button is depressed (step 46), the image recorded on the track for the size display pattern is read out and stored in the memory (step 47), and the image recorded on the track for the object is then read out and stored in the memory (step 48).

Thereafter, both the image signals of the size display pattern and the object are read out of the memory to be synthesized and reproduced on the TV monitor (step 49).

On the other hand, in the case of no instruction being given to provide the size display pattern, when the reproduction button is depressed (step 50), the image signal of the object recorded on any one of the tracks 2–5 to be reproduced is read out and once stored in the memory 34 (step 51).

The image signal stored in the memory 34 is then read out for reproduction (step 52).

Since the above-mentioned first and second embodiments are arranged to be able to record the image of an object and the image of a size display pattern (such as a scale) corresponding to the object image, and reproduce both the images simultaneously, the object image can be displayed on the TV monitor along with the scale or the like, permitting the user to easily and accurately know dimensions and/or length of the object.

Further, since an image pattern of scale graduations is generated from the photographing conditions (such as distance information and zoom information), the photographer is only required to give an instruction as to whether the scale information is to be taken in or not, which can eliminate the troublesome manipulations for setting the scale graduations.

Additionally, in no need of size display, it is possible to reproduce only the object image.

With one kind of size display shared for a plurality of objects like the second embodiment, a capacity-saving of the recording medium can also be realized.

While the scale is used as an example of the size display pattern in the first and second embodiments, there can also be thought other various examples of the size display pattern such as using color-coded zones or pictorial representations like illustrations.

As a modification of the first and second embodiments, the object image and the size display pattern may be both recorded on the same track. In this case, the size display pattern is always displayed along with the object image during reproduction. This modification can also be constructed into not only a system comprising a recording system circuitry and a reproducing system circuitry both equipped in an electronic still camera, but also a system comprising an electronic still camera equipped with only a recording system circuitry and a reproducer. The reproducer in the latter system is not required to incorporate a scale pattern generator, or a memory control circuit, a memory circuit or the like for synthesizing the object image and the size display pattern, and can be of normal type.

While the first and second embodiments have been explained as recording images on a recording medium with the analog recording technique, the illustrated systems may be modified to record images on a recording medium with the digital recording technique without departing the gist of the present invention.

A third embodiment of the present invention will be next described with reference to FIGS. 7 and 8.

This third embodiment uses a queue track as a special region for storing size information.

The queue track is provided as the 52th track of a video floppy and whether to use that track or not is an option.

Data to be recorded on the queue track is recorded with the NRZ (Non Return Zero) technique stipulated by EIAJ (Electric Industries Association of Japan) on the basis of advice and suggestions from the Data Recording W. G. (an abridgement of Subcommittee Working Group of Electronic Still Camera Meeting).

The queue track has a capacity of 16 kilo bytes among which about 15 kilo bytes, except those areas occupied by a directory and a system file, is available by the user. Thus, the available capacity is about 2200 times that for the ID recording.

Controllable items include sequencing and repetitive reproduction of image signals, sequencing and repetitive reproduction of voices (both of images and voices being subjected to programmed reproduction), control of print outputs, superposition of texts (such as characters and Chinese letters (Kanji), combined reproduction of image and voice texts, etc.

The size information in the present invention is additionally recorded on the queue track each time an image is recorded on a blank track.

Figure 7:
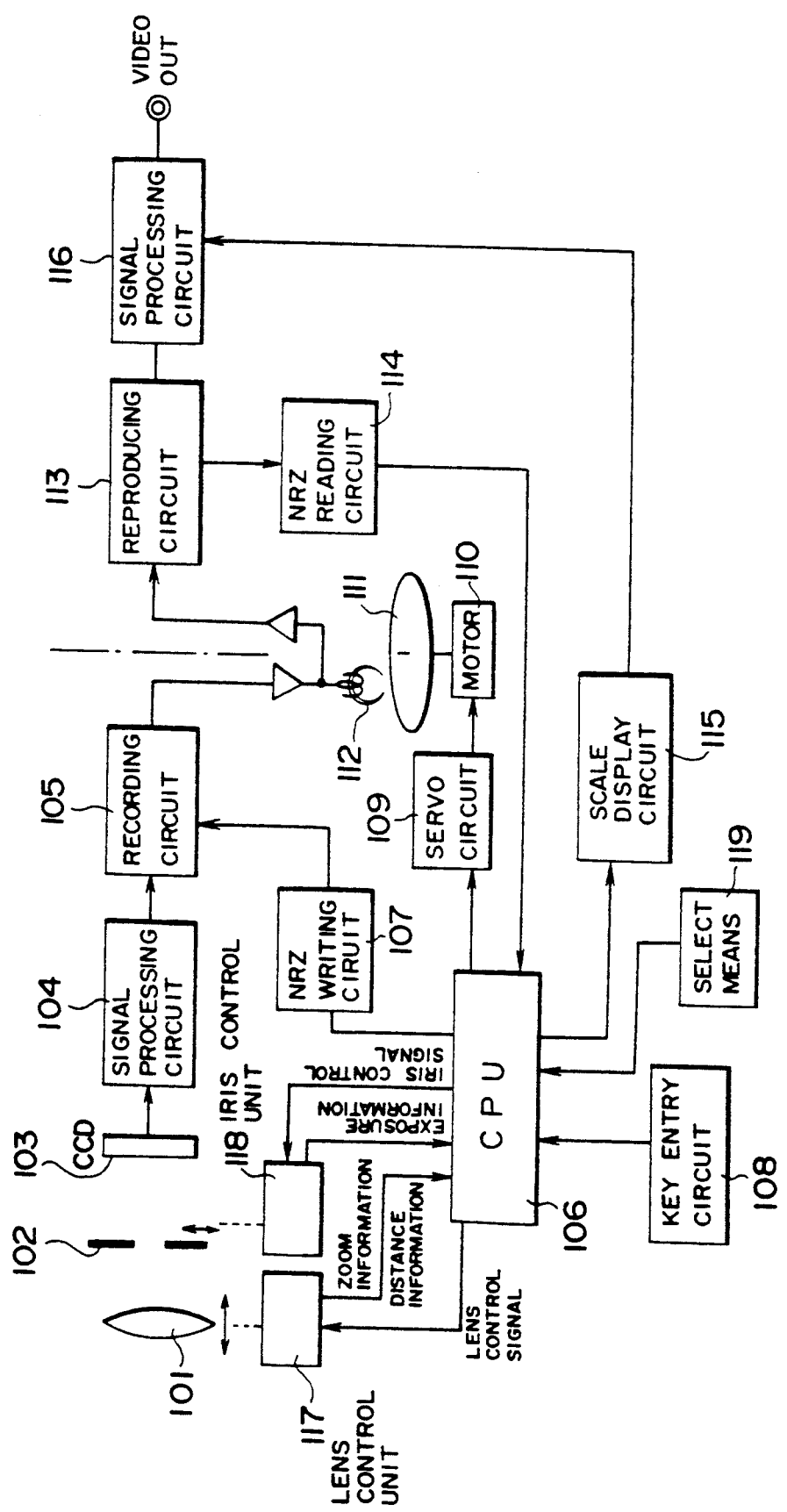
FIG. 7 is a circuit block diagram showing a third embodiment of a size display system for an electronic camera according to the present invention.

FIG. 7 is a circuit block diagram showing a third embodiment of a size display system for an electronic camera according to the present invention.

Image sensing system means comprises a lens system 101, an iris (diaphragm) 102, a CCD image sensor 103, and so forth.

The lens system 101 comprises a master lens, a focus adjusting lens, a magnification changing lens (i.e., a zoom lens), etc. with the iris 102 arranged behind the lens system 101.

Lens control means 117 comprises a drive unit for driving the focus adjusting lens and the zoom lens of the lens system 1, and a control unit for controlling these drive units.

Also, iris control means 118 comprises a drive unit for driving the iris and a control unit for controlling the drive unit.

The lens and iris control means 117, 118 are driven and controlled by control signals sent from a CPU 106.

When the CPU 106 actuates a CCD driver (not shown) to drive the CCD image sensor 103, an object image is taken into a signal processing circuit 105 via the image sensing system means and is displayed in an electronic finder (not shown).

Besides the above operation, the lens control means 117 drives the focus adjusting lens to perform the focusing operation based on a high-frequency signal taken out of the image signal. During the focusing operation and under the in-focus condition, information indicating the position of the focus adjusting lens (i.e., distance information) is sent to the CPU 106.

Further, when a signal indicating the zooming operation being actuated is input from the CPU 106, the zoom lens is driven to enlarge or reduce the object image into the desired dimensions.

Zoom lens position information, i.e., zoom information, in that case is also sent to the CPU 106.

On the other hand, the iris control means 118 drives and controls the iris 102 so that the object is given with the proper extent of exposure, and also sends exposure information (iris information and brightness information) at the present time to the CPU 106.

Upon receiving a shutter operation signal, the CPU 106 sends a control signal to the CCD driver so that the electric charges so far accumulated in the CCD image sensor 103 are expelled out to start transfer of the electric charges, followed by ending the charge transfer after a predetermined period of time (i.e., a shutter release time).

An electric signal of the object image from the CCD image sensor 103 is sent to the signal processing circuit 104. The signal processing circuit 104 inserts a synch signal, etc. into the signal from the image sensing system means for creating a predetermined image signal. The emphasis process is then performed, followed by FM modulation.

In the shutter release operation, the CPU 106 takes in the lens position information (distance information), the zoom information, and the exposure information (both the iris and brightness information) from the lens and iris control means 117, 118. Further, in-focus information as to whether the in-focus condition is reached or not can be obtained by detecting a high-frequency component of luminous information taken in from the signal processing circuit 104. In addition, the CPU 106 also takes in time (hour and minute) data (supplied from a not-shown clock circuit) and an identification code.

The above distance information, zoom information, iris information, brightness information, in-focus information and identification code (hereinafter referred to together as "the distance information, etc.") are sent from the CPU 106 to an NRZ writing circuit 107 where the distance information, etc. are converted into an NRZ signal.

A recording circuit 105 amplifies the NRZ signal output from the NRZ writing circuit 107 for adjustment into a proper recording current which is then recorded by a magnetic head 112 on a queue track of a video floppy 111.

A video floppy drive system as the center for driving the video floppy in the present system comprises a spindle motor 110 for rotating the video floppy 111 and a servo circuit 109 for controlling the spindle motor 110, thereby rotating the video floppy 111 at a predetermined speed and phase under control of the CPU 106. Also, a magnetic head drive system comprises a stepping motor and an associated driver (not shown) for intermittently driving the magnetic head 112 clockwise and counterclockwise so that the magnetic head 112 is moved to a blank track, a queue track, etc. on the video floppy 111 instructed by the CPU 106.

A display unit (not shown) comprising an LCD or the like is connected to the CPU 106 for indicating various conditions of the electronic still camera.

The circuit section on the right side of one-dot-chain line represents a reproducing system.

When reproduction is instructed from a key entry circuit 108, the CPU 106 sends a control signal to a reproducing circuit 113 to read the FM-modulated image signal out of the selected track on the video floppy 111.

A signal processing circuit 116 demodulates the FM-modulated signal and performs the de-emphasis process for restoration into the original image signal, followed by outputting the restored image signal to a video terminal.

When size display is instructed from select means 119, the distance information, etc. recorded in the NRZ format are read out of the queue track on the video floppy 111. The distance information, etc. are subjected to the inverse NRZ conversion in an NRZ reading circuit 114 for demodulation into the original signal.

Using the demodulated distance information, etc., the CPU 106 performs the arithmetic process to create a scale pattern and calculates data for size display.

Assuming now that 1/2 of the scale width indicating the full angle of visual field (in the horizontal direction) of the viewfinder is $l_1$, the distance information is $D_1$, and the zoom information, i.e., the angle of view, is $\theta_1$, there holds the following equation:

$$l_1 = D_1 \times \tan \theta_1$$

Accordingly, the scale width can be obtained by doubling the value of $l_1$.

While the above corresponds to an example of arithmetic operation under the in-focus condition, the scale width can also be calculated even under the out-of-focus condition in which the object is not brought into a focus. In the latter case, the scale width is calculated from distance information $D_1$ under the out-of-focus condition and a predetermined angle of view $\theta_2$. Besides, the exposure information (brightness information and iris information) is also used to adjust the contrast of scale display and know accuracy of the scale pattern from the depth of view field.

The CPU 106 calculates the data for size display as mentioned above and then sends it to a scale display circuit 115.

Figure 8:
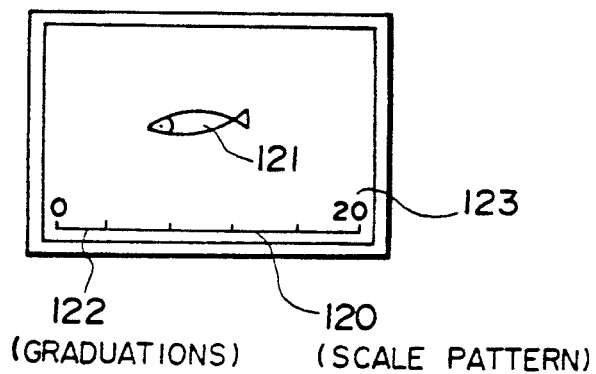
FIG. 8 is a diagram showing a display example of a size pattern on a TV monitor according to the third embodiment.

The scale display circuit 115 is to generate a signal indicating a pattern like a scale 120 shown in FIG. 8 and, based on the $l_1$ information, outputs a size display pattern signal corresponding to dimensions of the object. The scale pattern includes graduations 122 plotted on the basis of scale-graduation resolution data (obtained from the scale width data). Numerals 123 indicating the graduations 122 of the scale 120 are also generated.

The pattern signal from the scale display circuit 115 is sent to the signal processing circuit 116 and mixed to the image signal of the object. Then, a picture comprised of the image signal of the object and the scale pattern superposed thereon is sent to the video terminal.

As a result, the image of the object is displayed on a TV monitor (not shown) along with the scale.

The foregoing scale display is made for only the image brought into a focus and, if the image is out of a focus, the scale is not indicated even upon the size display operation. However, since the size information is also taken in under the out-of-focus condition, the scale can be indicated by the user operating a change-over switch or the like (not shown).

Where the recognition code is not correctly input or can not be read, too, the scale display is not made even upon the size display operation. This is aimed to prevent other faulty data stored on the queue track from being read out erroneously.

Further, inserting the identification code enables prohibition of read-out of the size information when the data are reproduced by using other system apparatus, thereby avoiding an adverse effect on the operation of those system apparatus.

While the above embodiment is explained as calculating the data for size display from the distance information, etc. during reproduction, the data for size display may be calculated during photographing and recorded on the queue track. In this case, the calculated data require smaller bits than the distance information, etc. and, therefore, a larger area on the queue track is available for any other desired data.

With this third embodiment, size information as a base for a size display pattern (such as a scale) corresponding to an image is stored in a special region other than the region in which an image signal of an object is to be stored, with a digital recording technique different from the technique for recording the image signal of the object. In reproduction, when size display is selected, the size information is read out of the special region on a recording medium and demodulated to generate a pattern such as a scale. This pattern such as a scale and the image signal of the object are mixed to each other and displayed on a TV monitor.

This results in advantages that the scale or the like can be displayed on the TV monitor simultaneously with the object image and the user's area can be used for other purposes.

Moreover, since the storage capacity is not limited as small as the ID information, it is possible to give a variety of displays such as different kinds of scale patterns or finer graduations on demand, and also provide an ability to store many other data.

Since those components in conformity with standards for electronic still cameras can be used, the present system can be realized through rearrangement of control means without using special parts, circuits and the like.

Additionally, with an identification code inserted, an adverse effect on other apparatus can be prevented.

A fourth embodiment of the present invention will be next described with reference to FIGS. 9 to 12.

Figure 9:
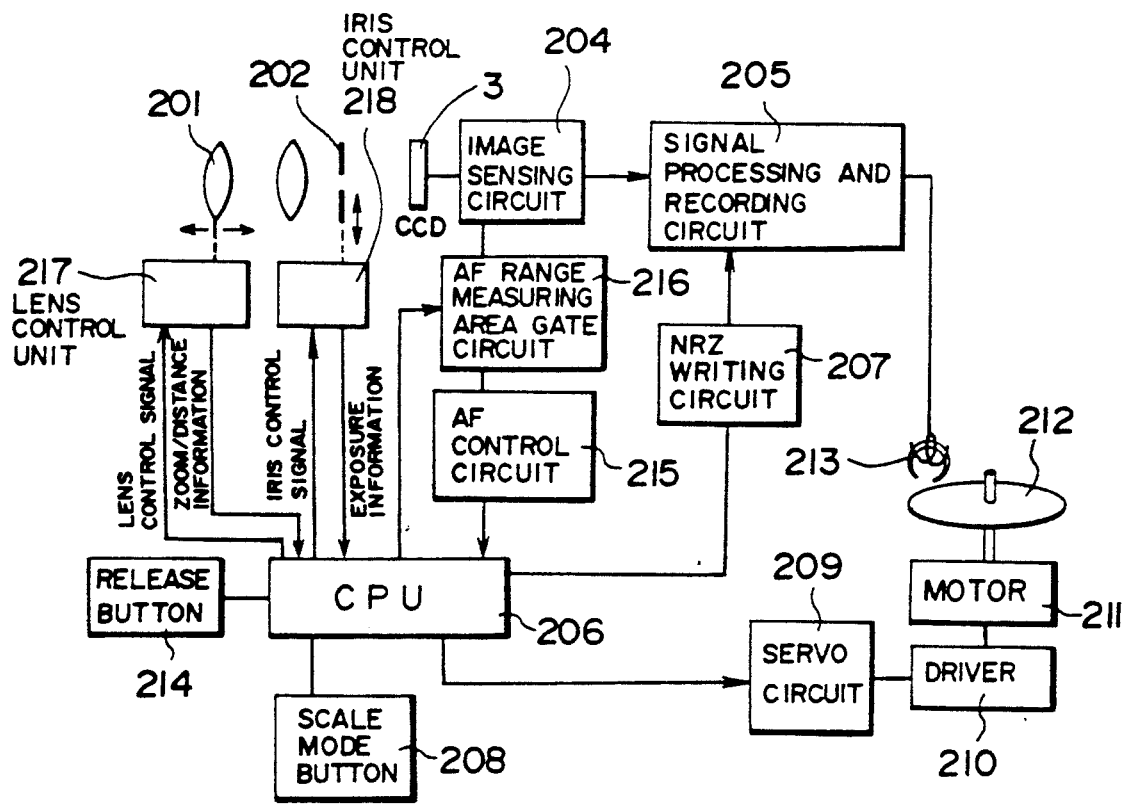
FIG. 9 is a circuit block diagram showing a fourth embodiment of a size display system for an electronic camera according to the present invention.

FIG. 9 is a circuit block diagram showing the fourth embodiment of a size display system for an electronic camera according to the present invention.

FIG. 9 illustrates only the section directly relating to the present invention and represents an example of a camera equipped with no reproducing system for display of a scale pattern.

To obtain a reproduced image, this camera must be loaded on a reproducer, or a video floppy recording both an object image and information for size display must be loaded on a reproducer.

A lens system 201, an iris (diaphragm) 202, a CCD image sensor 203, a lens control unit 217 and an iris control unit 218 cooperatively constituting image sensing system means correspond to the lens system 101, the iris 102, the CCD image sensor 103, the lens control unit 117 and the iris control unit 118 described above in connection with the third embodiment of FIG. 7, respectively, and are the same as the corresponding ones in arrangement and operation.

When a CPU 206 actuates a CCD driver (not shown) to drive the CCD image sensor 203, an object image is taken into an image sensing circuit 204 via the image sensing system means, converted into a predetermined image signal in a signal processing and recording circuit 205, and further displayed in an electronic finder (not shown).

Besides the above operation, the image sensing circuit 204 sends part of a luminance signal to an AF control circuit 215 via an AF range measuring area gate circuit 216. The AF control circuit 215 extracts a high-frequency signal from the luminance signal and sends it to the CPU 206. The CPU 206 sends a drive signal for the focus adjusting lens based on the extracted high-frequency signal, and the lens control unit 217 moves the focus adjusting lens to an in-focus position (i.e., a maximum level position of the extracted high-frequency signal) in response to the drive signal.

During the focusing operation and under the in-focus condition, information indicating the position of the focus adjusting lens (i.e., distance information) is sent to the CPU 206. Further, when a signal indicating the zooming operation being actuated is input from the CPU 206, the lens control unit 217 drives the zoom lens so as to enlarge or reduce the object image into the desired dimensions, and zoom lens position information, i.e., zoom information, in that case is also sent to the CPU 206, as with the third embodiment of FIG. 7.

The iris control unit 218 drives and controls the iris 202 so that the object is given with the proper extent of exposure, and also sends exposure information (iris information and brightness information) at the present time to the CPU 206, as with the third embodiment of FIG. 7.

Upon a release button 214 being depressed, the CPU 206 sends a control signal to the CCD driver so that the electric charges so far accumulated in the CCD image sensor 203 are expelled out to start transfer of the electric charges, followed by ending the charge transfer after a predetermined period of time (i.e., a shutter release time).

An electric signal of the object image from the CCD image sensor 203 is sent to the image sensing circuit 204. The image sensing circuit 204 sends part of the luminance signal to the AF range measuring area gate circuit 216 as mentioned above. Subsequently, the signal processing and recording circuit 205 inserts a synch signal, etc. into the signal from the image sensing circuit 204 for creating a predetermined image signal. After that, the image signal is subjected to the emphasis process and then FM modulation, followed by recording on a predetermined track of the video floppy 212 with a recording current adjusted based on the FM-modulated signal.

In the release operation, the CPU 206 takes in the lens position information (distance information), the zoom information, and the exposure information (both the iris and brightness information) from the lens and iris control units 217, 218. Further, in-focus information as to whether the in-focus condition is reached or not can be obtained by detecting a high-frequency component of the luminous information sent from the AF control circuit 215.

When a scale mode is selected, the above distance information, zoom information, iris information, brightness information and in-focus information are sent to an NRZ writing circuit 207 for conversion into an NRZ signal.

The signal processing and recording circuit 205 amplifies the NRZ signal output from the NRZ writing circuit 207 for adjustment into a proper recording current which is then recorded by a magnetic head 213 on a queue track of the video floppy 212.

The queue track is the same as that defined in the third embodiment.

A motor 211, a driver 210, a servo circuit 209, the video floppy 212 and the magnetic head 213 cooperatively constituting a video floppy drive system as the center for driving the video floppy in the present system correspond to the motor 110, the servo circuit 109, the video floppy 111 and the magnetic head 112 described above in connection with the third embodiment of FIG. 7, respectively, and are the same as the corresponding ones in arrangement and operation.

A display unit (not shown) comprising an LCD or the like is connected to the CPU 206 for indicating various conditions of the electronic still camera.

A scale mode button 208 connected to the CPU 206 is to set a mode for preparing a certain scale mode condition necessary to display a scale in the object image reproduced, and recording the taken-in distance information, etc. in the video floppy 212.

Upon the scale mode button 208 being depressed, the CPU 206 controls the zoom lens, the AF range measuring area gate circuit 216 and the iris control unit 218 in accordance with the preset algorithm, thereby setting the zoom information, the AF range measuring area and the iris to respective predetermined values.

Figure 10:
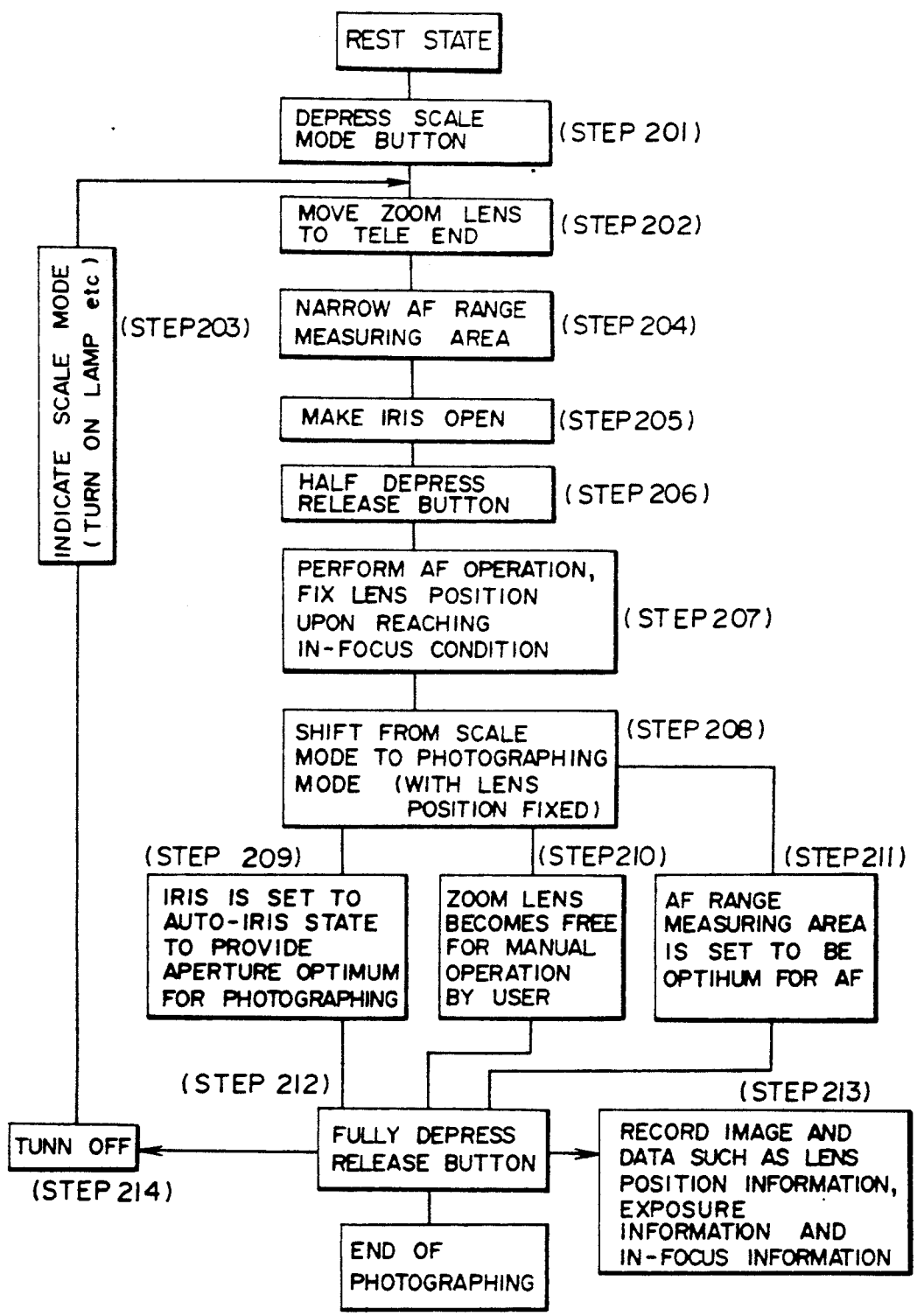
FIG. 10 is a flowchart for explaining manipulations and operations in the circuit of the embodiment of FIG. 9.

FIG. 10 is a flowchart for explaining operation in setting a scale mode in the circuit according to the embodiment of FIG. 9.

When the scale button 208 is depressed (step 201), a scale mode signal is sent to the CPU 206. The CPU 206 controls the lens drive unit 217 for moving the zoom lens to a tele end (step 202). The reason why the zoom lens is moved to the tele end is making the depth of view field as shallow as possible. The CPU 206 also controls the AF range measuring area gate circuit 216 for making the range measuring area narrower than that in normal photographing (step 204). The extent of this area is preset and the narrower area enables an improvement in accuracy of the range measuring position. Further, the CPU 206 controls the iris control unit 218 to make the iris fully open (step 205). However, if the luminance signal is saturated to disable the focusing operation depending on an illuminated condition of the object with the iris being fully open, the iris is set to an aperture near the full-open extent so long as the focusing operation can be effected.

Beside the above operations, the CPU 206 turns on a lamp or the like for effecting scale mode display as well (step 203).

Next, when the release button 214 is half depressed (step 206), the CPU 206 takes in from the AF control circuit 215 the high-frequency component of the image signal for the narrower range measuring area than a normal photographing state, causing the lens control unit 217 to perform focusing control. Upon detecting in response to a signal from the AF control circuit 215 that the focus adjusting lens has been brought into an in-focus position, the CPU 206 instructs the lens control unit 217 to make control so that the focus adjusting lens is held at the in-focus position and will not move therefrom (step 207).

Subsequently, the mode is shifted from the scale mode to a photographing mode (step 208) where the iris is set to an auto-iris state to provide an aperture value optimum for the present photographing, the zoom lens becomes free to enable the manual operation, allowing the user to select any desired angle of field, and further the AF range measuring area is controlled to the extent optimum for AF (steps 209, 210 and 211).

After that, when the release button 214 is fully depressed to release a shutter (on this occasion, the release button 214 may be fully depressed after once returning it from the half-depressed position to the original position), the object image is recorded on the video floppy 212 and, simultaneously, the distance information as obtained when the focus adjusting lens is fixed, as well as the zoom information, the exposure information and the in-focus information as obtained when the shutter is released, are taken in by the CPU 206 and converted into the NRZ signal by the NRZ writing circuit 207, followed by recording on the queue track of the video floppy 212 (step 213). Also, the lamp or the like indicating the scale mode is turned off (step 214).

Whenever a clear button (not shown) is depressed during the above operation steps, the control process is returned to the rest state at the beginning.

Figure 11:
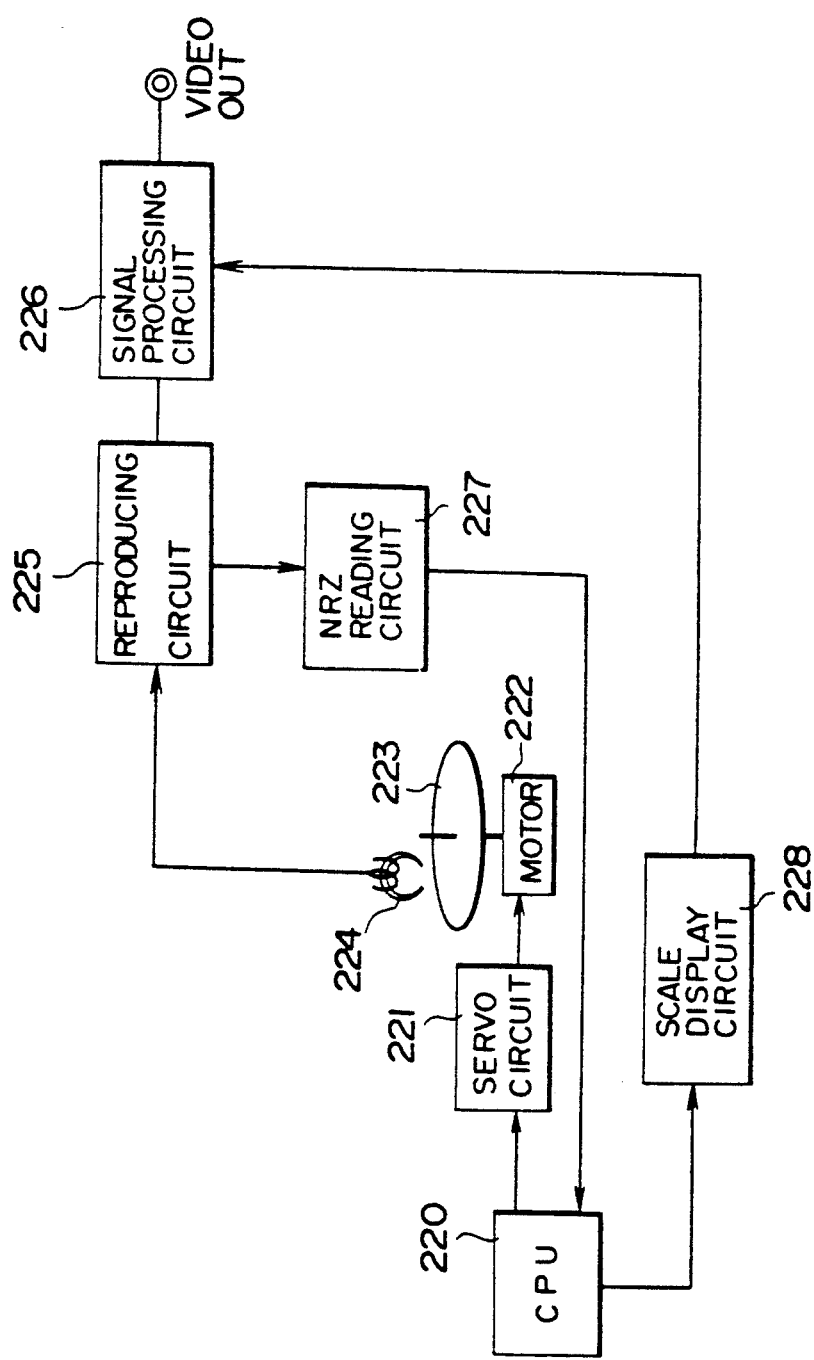
FIG. 11 is a circuit diagram showing an example of a reproducer for reproducing an image photographed by the electronic camera of FIG. 9.

FIG. 11 is a circuit diagram showing an example of a reproducer for reproducing an image photographed by the electronic camera of FIG. 9.

When reproduction is instructed from a key entry circuit (not shown), a CPU 220 sends a control signal to a reproducing circuit 225 to read the FM-modulated image signal out of the selected track on a video floppy 223.

A signal processing circuit 226 demodulates the FM-modulated signal and performs the de-emphasis process for restoration into the original image signal, followed by outputting the restored image signal to a video terminal.

When size display is instructed from select means (not shown), the distance information, etc. recorded in the NRZ format are read out of the queue track on the video floppy 223. The distance information, etc. are subjected to the inverse NRZ conversion in an NRZ reading circuit 227 for demodulation into the original signal.

Using the demodulated distance information, etc., the CPU 220 performs the arithmetic process to create a scale pattern and calculates data for size display. The calculated data for size display are then sent to a scale display circuit 228.

The scale display circuit 228 is to generate a scale pattern signal for presenting a scale similar to that shown in FIG. 8.

The pattern signal from the scale display circuit 228 is sent to the signal processing circuit 226 and mixed to the image signal of the object. Then, a picture comprised of the image signal of the object and the scale superposed thereon is sent to the video terminal.

As a result, the image of the object is displayed on a TV monitor (not shown) along with the scale pattern.

While the above embodiment is explained as recording the image signal of the object in an analog manner, the embodiment can also be realized in the case of using a semiconductor memory (such as an IC card) as a recording medium and recording the image signal of the object thereon in a digital manner.

Also, while the functions of calculating the data for size display and generating the scale pattern is provided on the reproducer side, these functions may be provided on the camera side to record the data of the scale pattern signal on the queue track.

It is to be noted that although there are video cameras loaded with a still function, these cameras also fall in the scope of the electronic camera of this embodiment so long as they satisfy all the requirements defined in the claims of the present invention.

Thus, the fourth embodiment is arranged to provide scale mode setting means and, when a scale mode is set, the zoom lens is moved to a tele end, the iris is made fully open, and the AF range measuring frame (area) is made narrower than that in normal photographing. The lens position is fixed upon reaching an in-focus condition, and the distance information, etc. as obtained in the fixed position is utilized. Then, the data for size display are calculated from the distance information, etc. to generate a scale pattern so that a scale is displayed on the reproduced screen or the like together with the object image with the result of improved accuracy.

Further, since the zoom lens, the iris and the AF range measuring area are set as mentioned above upon setting to the scale mode, the photographer can take in the scale information for scale display under conditions of superior AF accuracy by such a simple operation as depressing the release button like the prior art.

Although with the procedure of the embodiment of FIG. 4, the scale mode is always once set to perform the focusing operation, followed by shifting to the photographing mode, this procedure will cause no problem because instantaneous photographing is not usually effected when recording the scale information at the same time.

In desiring to know the contents of AF accuracy in detail, size error display may be associated with the scale. In this case, upon the scale mode being set, the depth of view field is calculated from the distance information and the iris information and the size error range is calculated from the depth of view field, following which size error indications such as +0.3 m, −0.2 m, for example, are displayed near the scale pattern during scale display. By so arranging, the scale accuracy can be known in detail, enabling the user to judge dimensions of the object in consideration of the extent of size error.

A fifth embodiment will be next described in detail with reference to FIGS. 12 to 15.

FIG. 12 is a diagram for explaining the principles of how to calculate the distance (size) between two measured points captured in the visual field of a finder, in order to explain the fifth embodiment of the present invention.

FIG. 12 shows a state where two objects 353 and 354 to be measured are captured in the visual field of the finder.

Supposing that one measured object 353 exists at a coordinate position Q on the plane normal to a straight line passing almost the center of the lens system, the other measured object 354 is supposed to exist at a coordinate position P on another plane which has substantially the same center as that of the above plane and is parallel to the above plane.

Accordingly, the coordinate positions Q and P are focused at corresponding positions on the surface of a CCD image sensor 350 and thus can be detected on the surface of the CCD image sensor.

By moving the AF range measuring frame to cover the measured object 353, the focusing operation is performed for the measured object 353 so that distance information Lq up to the measured object 353 can be obtained from information indicating the position of the focus adjusting lens at that time. Also, the position Q on the screen at which the measured object 353 exists can be obtained from the position of the range measuring frame.

The AF range measuring frame is freely movable by controlling a gate circuit which in turn drives the CCD image sensor.

For the measured object 354, distance information Lp and position information P in the plane can also be obtained in a like manner.

Assuming now that the distance (size) between the two coordinate positions P and Q is L, the distances from the CCD image sensor 350 to the coordinate positions P and Q are respectively $l_2$, $l_1$, and the angles of the coordinate positions P and Q with respect to the optical axis are respectively $\theta_2$, $\theta_1$, L is expressed by:

$$L = \{(l_1\sin\theta_1 + l_2\sin\theta_2)^2 + (l_2\cos\theta_2 - l_1\cos\theta_1)^2\}^{\frac{1}{2}} \quad (1)$$

Figure 13:
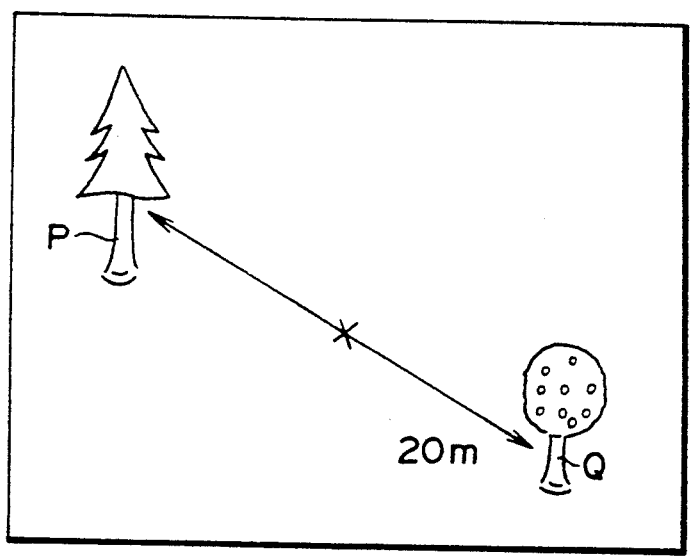
FIG. 13 is a diagram for explaining a method to determine the photographing distance in the screen of FIG. 12 when a size display mode is set.

FIG. 13 is a diagram for explaining a method to determine the photographing distance in the screen of FIG. 12 when a size display mode is set.

This diagram shows the screen reproduced on an electronic viewfinder or a monitor, and a numeral, a unit and a scale showing the measuring span are displayed between the two measured points P and Q to indicate the distance therebetween.

After determining the distance between the two measured points P and Q, photographing distance R is calculated from the following equation (2) so that the two measured points P and Q are sharply photographed, and the focus adjusting lens is adjusted so that the focal length becomes equal to the photographing distance R:

$$R = \{Lp \times Lq\}^{\frac{1}{2}} \quad (2)$$

Further, the iris is adjusted so as to provide an aperture as small as possible.

FIG. 14 is a circuit block diagram showing the fifth embodiment of a size display system for an electronic camera according to the present invention.

A lens system 301, an iris (diaphragm) 302, a CCD image sensor 303, an iris/auto-focus control circuit 318, a shutter control circuit 316 and a CCD driver 317 cooperatively constituting image sensing system means 304 correspond to the lens system 1, the iris 2, the CCD image sensor 3, the iris/auto-focus control circuit 18, the shutter control circuit 16 and the CCD driver 17 described above in connection with the first embodiment of FIG. 2, respectively, and are the same as the corresponding ones in arrangement and operation.

A size display mode switch 338 is to bring the camera into a size measurement/display mode.

A contrast detecting unit 320, a timing generator 321, a color matrix circuit 305 and a Y process circuit 309 correspond to the contrast detecting unit 20, the timing generator 21, the color matrix circuit 5 and the Y process circuit 9 described above in connection with the first embodiment of FIG. 2, respectively, and are the same as the corresponding ones in arrangement and operation.

A character and size insertion circuit 306 is to insert specified color information from a character and size pattern generator 319 for representing a size and scale in the specified color.

Also, a character and size insertion circuit 310 is to insert a scale signal (including a numeral, a unit and a scale pattern signal for indicating the distance (size) between the two measured points) into the luminance signal. These character and size insertion circuits 306 and 310 operate only while a scale signal is being sent from the character and size insertion circuit 319. In other words, when the color difference signals and the luminance signal, both making up the object image, are respectively supplied from the color matrix circuit 305 and the Y process circuit 309, no scale signal is inserted into those signals. Accordingly, the character and size insertion circuits 306 and 310 output the image signal of the object and an image signal inserted with only the scale signal at the timings different from each other.

The color difference signals and the luminance signal having passed through the character and size insertion circuits 306 and 310 are sent to a recording/processing circuit 307 comprised of an emphasis circuit, a modulator and a synthesizer.

The recording/processing circuit 307 performs the emphasis process for the color difference signals and the luminance signal, followed by FM-modulating and then synthesizing them. The synthesized signal is recorded by a magnetic head 325 on a predetermined track of a video floppy 324.

At this time, when the scale signal is also taken in, the image signal comprising only the scale signal is recorded on a track at an even number, whereas the image signal of the object is recorded on a track at an odd number.

The information making the track number for the image of the object and the track number for the image comprising only the scale signal correspondent to each other are stored in a memory built in a CPU 314.

A VFD (Video Floppy Drive) interface circuit 322, a VFD 323, the magnetic head 325 and the video floppy 324 correspond to the VFD interface circuit 22, the VFD 23, the magnetic head 25 and the video floppy 24 described above in connection with the first embodiment of FIG. 2, respectively, and are the same as the corresponding ones in arrangement and operation.

The circuit section on the right side of one-dot-chain line represents a reproducing system.

The image signal of the object recorded in the video floppy 324 on the track at a predetermined odd number is read out under control of the CPU 314 by a reproducing/processing circuit 326 comprised of a Y/C separation circuit, a demodulator and a de-emphasis circuit.

The reproducing/processing circuit 326 separates the read-out image signal of the object into a luminance signal modulation wave and color difference signal modulation waves, followed by demodulation and restoration into the original characteristics.

The demodulated R-Y and B-Y color difference signals are synchronized with each other by an R-Y/B-Y synchronizing circuit 329 and, thereafter, the signals thus synchronized and the luminance signal from the reproducing/processing circuit 326 are input to an NTSC encoder 330.

The NTSC encoder 330 converts those signals into NTSC signals and sends the converted NTSC signals to an A/D converter 333.

An output of the A/D converter 333 is once stored in an address space of a memory 334 specified by a memory control circuit 337 upon receiving an instruction from the CPU 314.

Here, when the CPU 314 receives via key entry an instruction to effect size display simultaneously, it reads out the track number information of the even-number track making a set in combination with the predetermined odd-number track from the built-in memory, and controls the VFD interface circuit 322 to move the magnetic head 325 on that even-number track. When the magnetic head 325 is positioned onto that even-number track, the image signal comprising only the scale signal is read out.

The image signal comprising only the scale signal thus read out is processed in a like manner to the image signal of the object and converted into a digital signal by the A/D converter 333.

The memory control circuit 337 causes the image signal comprising only the scale signal to be stored in an address space of the memory 334 separate from that in which the image signal of the object is stored. Thereafter, both the image signal of the object and the image signal comprising only the scale signal are simultaneously read out of the memory 334 by the memory control circuit 337 and synthesized to each other, followed by conversion into an analog signal through D/A converter 335.

The D/A-converted analog signal is amplified by a video amplifier 336 and output from a video output terminal.

The manipulations and recording operation in setting a size display mode and taking a photograph will be next described with reference to FIGS. 13 and 14. Note that the camera is fixedly installed by a tripod or the like.

After depressing the size display mode switch 338, when keys are manipulated to move the AF range measuring frame and stopped it over the desired object (measured point Q), the focusing operation is performed for that object and the focus adjusting lens position information (i.e., the distance up to the measured point Q), and the zoom information of the zoom lens at that time are taken into the CPU 314. Simultaneously, the CPU 314 can know the position of the object on the screen from judging which gate circuit of the CCD image sensor 303 is controlled.

By manipulating keys successively, the distance information, the zoom information and the information of position on the screen for the next object (measured point P) can also be obtained.

After obtaining the distance information, the zoom information and the information of positions on the screen for those two measured points, the CPU 314 performs computations of the above equation (1) in accordance with the predetermined algorithm to calculate the distance between those two measured points and the data for a scale to be inserted therebetween.

Beside the above operation, the CPU 314 controls the iris/auto-focus control circuit 318 to narrow an aperture of the iris 302 as small as possible, taking into account the relation of a shutter speed with respect to an EV value of the object. Thereafter, the CPU 314 calculates the photographing distance R from the above equation (2) using the distances up to the measured points P and Q, and controls the iris/auto-focus control circuit 318 so that the focal length of the focus adjusting lens becomes equal to the photographing distance R.

Through the above operations of the CPU 314, the photographing conditions are set so as to obtain the maximum depth of view field and include the two measured points P, Q in that depth of view field.

When the photographer half depresses the release button, the distance between the two measured points and the scale data are sent to the character and size pattern generator 319 to display the size (distance) and the scale between the measured points P and Q in the screen of the electronic finder.

After confirming the screen inclusive of size display, when the photographer fully depresses the release button, the image signal of the object is recorded on an odd-number track and the image signal comprising only the scale signal is recorded on the even-number track, respectively.

In order to display the size and the scale during reproduction, key manipulations for reproduction are entered after depressing the size display mode switch 338, whereby the numeral value indicating the size, unit and scale are displayed together with the object image on the screen of the reproducing monitor.

Figure 15:
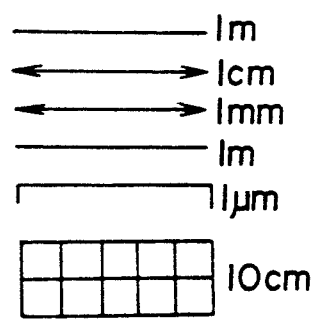
FIG. 15 is a diagram showing examples of various scales for use in the fifth embodiment.

FIG. 15 is a diagram showing examples of various scales for use in the fifth embodiment.

A variety of scale shapes are available other than the scale having arrows at both ends used in this embodiment.

While the above fifth embodiment illustrates the case of using an electronic still camera of the analog recording type, this embodiment can also be realized in an electronic still camera of the digital recording type.

In the latter case, the image signal of the object is D/A-converted and then recorded in a semiconductor memory, e.g., an IC memory. Since the data for the scale, etc. are in the form of coded-information, good matching is ensured.

In photographing, when size display is instructed, the digital data for the object and the scale signal are stored in the semiconductor memory in the same address space or separate address spaces made correspondent to each other.

In reproduction, where the digital data are stored in the same address space, the object image added with display of the scale, etc. is reproduced by reading out the data as they are. Where the digital data are stored in the separate address spaces, the object image can be reproduced with an option as to whether the scale, etc. is to be inserted or not.

Note that since the scale between two measured objects in this embodiment is inserted to indicate which objects are distanced through the size and is enough to make sure the indication to such an extent that the photographer can confirm the size between which objects, it is not required to be precisely inserted between the two measured objects.

While the above embodiment is explained as displaying a numeral value and a unit indicative of the scale and the size, part of these indications may be omitted in display.

The display position of a numeral value and a unit is illustrated below the scale, but those indications may be displayed at any position above, below, to the left or to the right of the scale.

Further, colors and density of the scale, etc. can be selected depending on the background color.

While the distance between two measured points is calculated by assuming two parallel planes respectively including those measured points, it is also possible to suppose the spherical surface including those measured points and calculate the distance therebetween in consideration of a solid angle.

As an alternative, the position information of each measured point may be displayed by using a vector.

Further, while the distance up to the measured point is obtained from the lens position information in this embodiment, a separate range measuring sensor may be provided.

Size display may be performed in cooperation with a strobe shot.

As described above, the fifth embodiment is arranged such that when two measured points on one or two objects captured in the same visual field are specified, the size between those two measured points and the scale data are calculated; an aperture of the iris is narrowed as small as possible, taking into account the relation of a shutter speed with respect to an EV value of the object; the photographing distance is determined by calculating a square root of the product of the distances up to the two measured points; and further the focal length of the focus adjusting lens is adjusted to become equal to the calculated photographing distance.

Accordingly, even where two measured points are distanced from each other in the direction away from the photographer, those two measured points can be sharply photographed in the depth of view field.

In the first to fifth embodiments, when the scale is displayed together with the object image, it will not clearly appear sometimes for the reason that the scale color is akin to the background color, or in relation to brightness of the background. Taking into account such cases, it is also possible to provide color select means which can prepare a plurality of colors for the scale pattern in advance and allows the photographer or a person starting the reproducing operation to select the color scale at his or her discretion, or luminance adjusting means which can adjust luminance of the scale pattern.

A sixth embodiment of the present invention will be next described in detail with reference to FIGS. 16 to 21.

Figure 16:
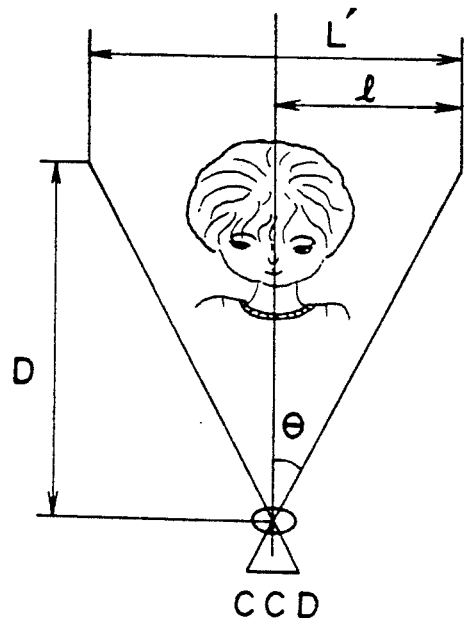
FIG. 16 is a diagram showing the relationship between an object to be photographed and an image sensing system in order to explain a sixth embodiment of a size display system for an electronic camera according to the present invention.
Figure 17:
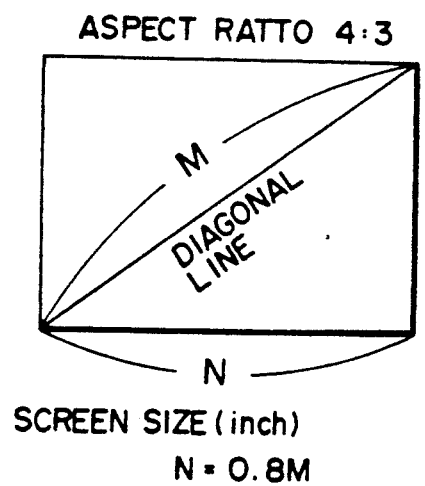
FIG. 17 is a diagram showing a screen size of a TV monitor connected to an output unit in the sixth embodiment.

FIGS. 16 and 17 are diagrams for explaining a method of calculating a scale factor (magnification) in a size display system for an electronic camera according to the present invention. FIG. 16 shows the relationship between an object to be photographed and an image sensing system.

Assuming that the transverse length of a photographing area at the object position is L' (L'=2l), l can be expressed by;

$$l = D \tan \theta \qquad (3)$$

where D is the distance up to an object, $\theta$ is the angle indicating a zoom magnification, and l is $\frac{1}{2}$ of L'.

FIG. 17 is a diagram showing a screen size of a TV monitor connected to an output unit in the sixth embodiment.

Assuming that the length of a diagonal line in M (in conformity with a method of indicating the screen size of a TV or projector) and the horizontal size is N, N can be expressed below because of the aspect ratio being 4:3:

$$N = 0.8M \qquad (4)$$

Assuming that the scale factor of the reproduced screen by the output unit relative to the object is $\alpha$, $\alpha$ can be obtained below from the above equations (3) and (4).

$$\alpha = N/L' \qquad (5)$$

The scale factor can be thus determined in the case of a TV with the output unit having the aspect ratio of 4:3. Note that in the case of a TV having the aspect ratio of 16:9, the constant (0.8) in the equation (4) is changed.

Where the output unit is a printer or the like as a hard copy, the paper size is given by A4, B5, etc. such that the horizontal size corresponding to N is fixedly specified and, therefore, the specified value may be used as it is.

Figure 18:
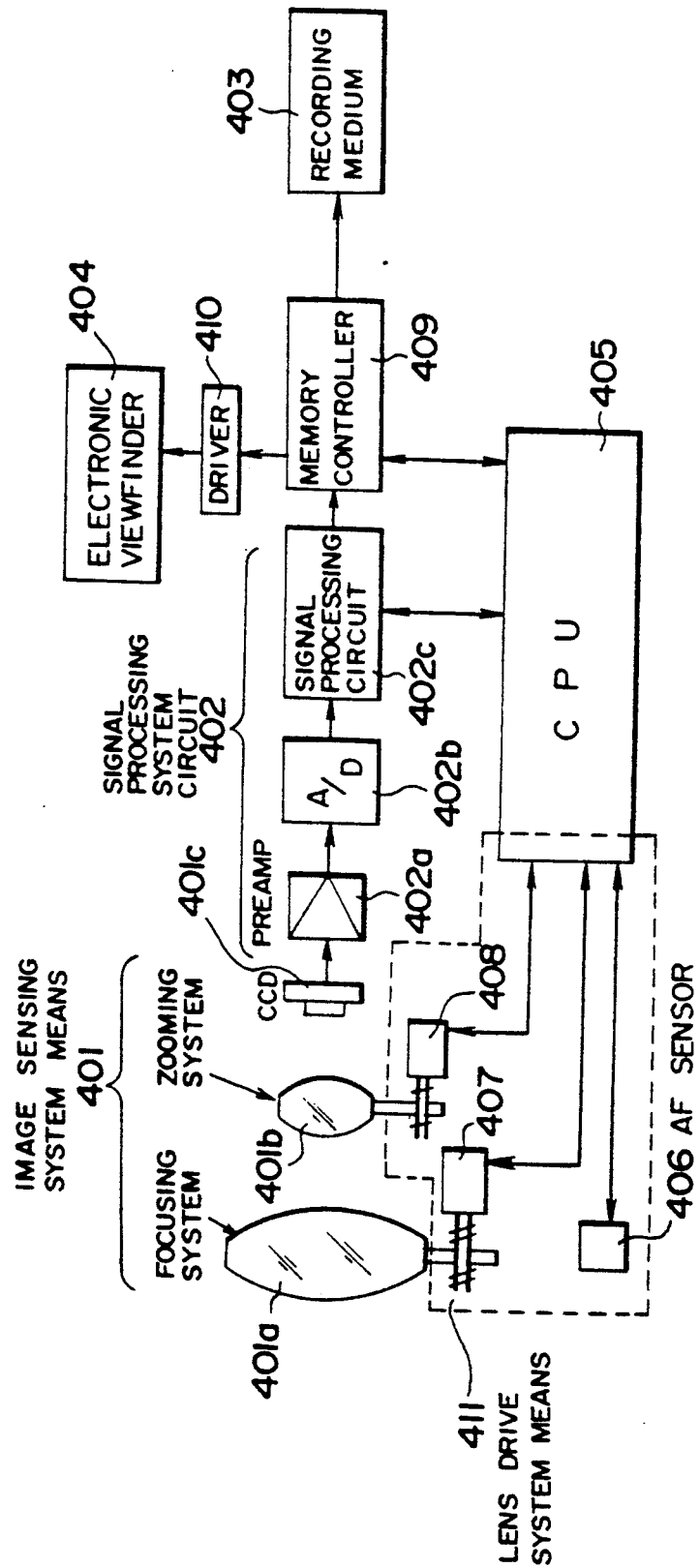
FIG. 18 is a circuit block diagram of a recording system, showing the sixth embodiment of a size display system for an electronic camera according to the present invention.

FIG. 18 is a circuit block diagram of a recording system, showing the sixth embodiment of a size display system for an electronic camera according to the present invention.

Image sensing system means 401 comprises a focusing system lens 401a, a zooming system lens 401b and a CCD image sensor 401c.

Lens drive system means 411 comprises focusing system lens drive means 407 provided with a drive unit for driving the focus adjusting lens 401a and a control unit for controlling the drive unit, zooming system lens drive means 408 provided with a drive unit for driving the zoom lens 401b and a control unit for controlling the drive unit, an AF sensor 406, and part of a CPU 405.

When the CPU 405 actuates a CCD driver included in the image sensing system means 401 to drive the CCD image sensor 401c, an object image is taken into a signal processing system circuitry 402 via the image sensing system means 401 and displayed in an electronic viewfinder 404 via a memory controller 409 and a driver 410.

The signal processing system circuitry 402 comprises a preamplifier 402a, an A/D converter 402b and a signal processing circuit 402c.

A signal output from the CCD image sensor 401c is amplified by the preamplifier 402a, A/D-converted by an A/D converter 402b and, thereafter, processed into a predetermined image signal by the signal processing circuit 402c.

The memory controller 409 drives the driver 410 for displaying the image signal in the electronic viewfinder 404 in response to an instruction from the CPU 405, and also records the image signal on a recording medium 403 in response to a release signal.

Where this embodiment comprises an electronic still camera, the recording medium 403 records a digital image signal of the photographed frame taken in upon the release operation. In the case of a video camera, the recording medium 403 successively records images taken in from the image sensing system during the recording operation.

The AF sensor 406 is a light receiving element for receiving an infrared ray which is emitted to the object and reflected therefrom. The CPU 405 obtains information of the distance up to the object by receiving a signal from the AF sensor 406 and, based on the signal, also drives the focusing system lens drive means 407 so that the focusing system lens 401a is controlled to be brought into an in-focus position. A signal indicating whether the focusing system lens 401a is brought into an in-focus position or not is sent from the focusing system lens drive means 407 to the CPU 405.

When the zooming operation is preformed by touching a zoom button (not shown), the CPU 405 drives the zooming system lens drive means 401b so that the object image is adjusted to dimensions in accordance with the zooming operation. Zoom lens position information, i.e., zoom information, at that time is also sent to the CPU 405. In addition, an iris (not shown) is controlled by an associated drive system so that the object is given with a proper extent of exposure.

When the photographer releases a shutter button, the information of the distance up to the object and the zoom information at that time are recorded on the recording medium 403 via the memory controller 409 together with the object image displayed in the electronic viewfinder 404.

Figure 19:
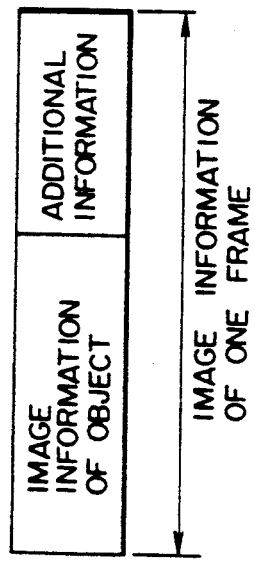
FIG. 19 is a diagram showing a format example of image information for one frame in FIG. 18.

FIG. 19 is a diagram showing one example of image information for one frame in FIG. 18.

As shown, the image information for one frame comprises the image information of the object and additional information including the distance, zoom and other information.

Figure 20:
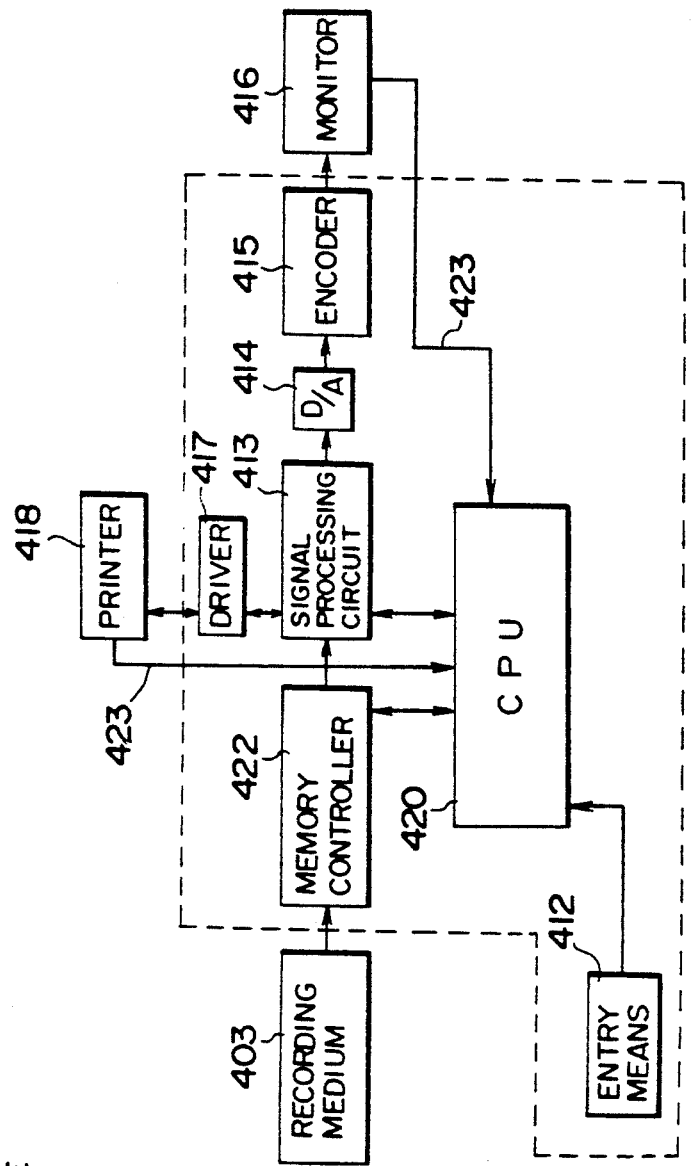
FIG. 20 is a circuit block diagram of a reproducing system, showing the sixth embodiment of a size display system for an electronic camera according to the present invention.

FIG. 20 is a circuit block diagram of a reproducing system, showing the sixth embodiment of a size display system for an electronic camera according to the present invention.

A memory controller 422 reads the image information and the additional information out of the recording medium 403 and sends them to a signal processing circuit 413. The signal processing circuit 413 performs the predetermined process on the image information and the additional information sent thereto, following which the image information is subjected to D/A-conversion by a D/A converter 414. The D/A-converted image information is converted by an encoder 415 into an NTSC signal to be reproduced on a monitor 416.

Upon the CPU 420 instructing the image information to be output to a printer 418, the signal processing circuit 413 causes the image information to be output via the driver 417 to the printer 418 as well.

Entry means 412 such as a keyboard (KB) includes keys necessary for reproduction and additional keys for instructing a print output, inputting scale factor information to specify a screen scale factor of the monitor 416 relative to the object, and other purposes.

Screen size information and size information of copy paper being set are also sent to the CPU 420 via data lines 423 from the monitor 416 and the printer 418, respectively. Input to the CPU 420 are a numerical value (e.g., 29 inches) indicating the screen size information in units of inch from the monitor 416 and a symbol (e.g., A4) indicating the standard paper size from the printer 418.

Both the screen and paper size information of the monitor 416 and the printer 418 may be input from the entry means 412 rather than the data lines 423. In reproducing the object image on the monitor 416, when the additional information is obtained from the signal processing circuit 413, the CPU 420 calculates the scale factor $\alpha$ from the above equations (3), (4) and (5) based on the distance information and the zoom information both included in the additional information, as well as the screen size information of the monitor. Then, the CPU 420 sends character pattern information derived from a character generator (not shown) corresponding to the scale factor $\alpha$ to the signal processing circuit 413. In the signal processing circuit 413, the character pattern information indicating the scale factor is inserted into the object image. The resultant information comprising the object image and the character pattern information indicating the scale factor inserted therein is sent to the monitor 416 via the D/A converter 414 and the encoder 415, whereby the scale factor of the reproduced object image relative to the actual object is displayed.

When the print output is instructed from the entry means 412, the CPU 420 performs similar calculations to the above based on the additional information and the paper size information from the printer 418, thereby determining the scale factor $\alpha$. After the process of inserting the scale factor $\alpha$ in the signal processing circuit 413, the driver 417 is driven to print the object image on a sheet of paper set in the printer 418, along with the scale factor printed at one corner of the paper sheet.

Figure 21:
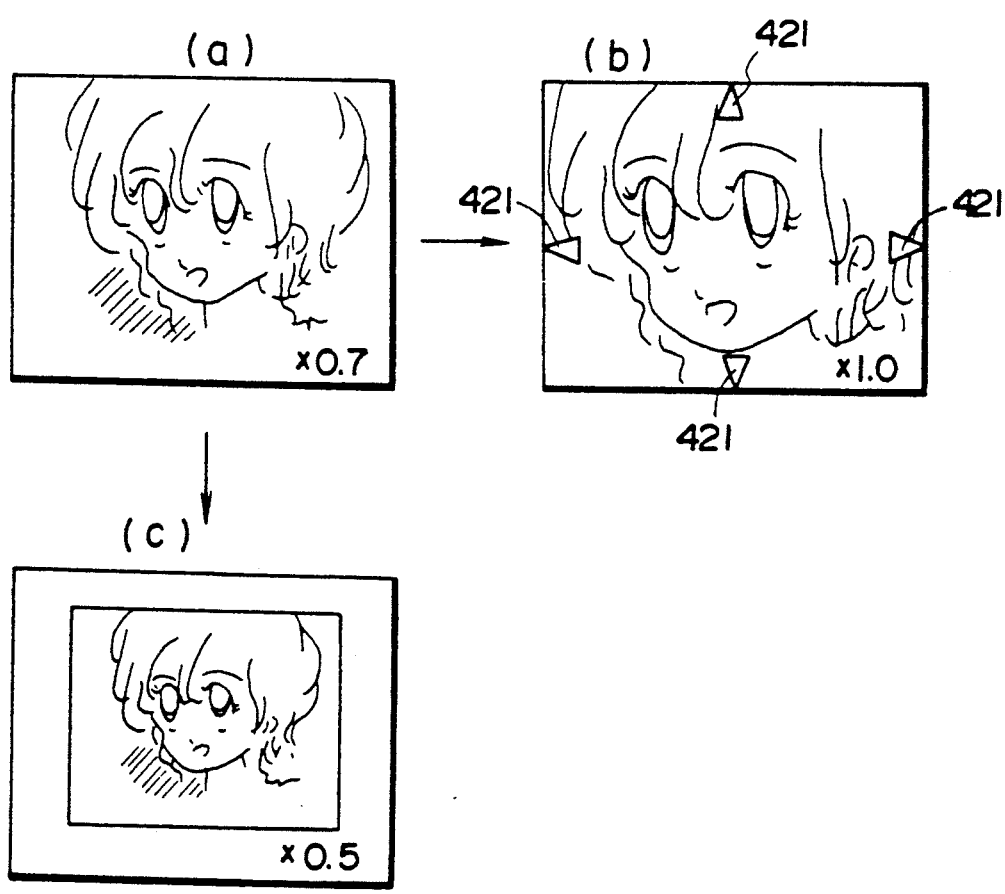
FIG. 21 is a diagram for explaining display examples of the reproduced screen in the sixth embodiment.

(a) of FIG. 21 shows one example of the reproduced screen in the monitor.

In the reproduced screen, the photographed image is displayed to spread over the entire screen and the scale factor of the image is indicated at a lower right corner of the reproduced image.

Now, in order to obtain the image at a different scale factor from that of the presently reproduced image, the desired scale factor is input from the entry means 412, whereupon the reproduced screen is adjusted to the desired scale factor. When information indicating a full-size scale factor is entered, for example, the CPU 420 controls the signal processing circuit 413 to perform the electronic zooming operation so that the screen and hence the image is enlarged to the full-size while displaying the new scale factor.

(b) of FIG. 21 is an example of the reproduced screen in the above case.

To inform the image being enlarged, alarm indications 421 are superimposed on four sides of the screen.

In this case, since some regions of the photographed image spread beyond the display screen, the display screen can be scrolled so as to display the entire photographed image by entering a scroll display command from the entry means 412.

Also, when information indicating the image at a smaller scale factor of 0.5 than that of the presently reproduced image, the CPU 420 controls the signal processing circuit 413 to perform the electronic zooming operation so that the screen and hence the image is reduced to 0.5 time the full-size while displaying the new scale factor.

(c) of FIG. 21 is an example of the reproduced screen in the case of reduction to 0.5 time the full-size.

In this reproduced screen, the peripheral portions not included in the photographed image are wiped and the scale factor is displayed at one corner of the peripheral portions. The peripheral portions may be colored by selecting any one of various colors.

While the above image examples shown in (a), (b) and (c) of FIG. 21 are related to the case of outputting the image on a monitor, the similar images can also be obtained when a printer is used to produce a hard copy. In the case of print output, the degree of freedom in selecting the paper size is greater than the case of silver salt film photography, resulting in a practical advantage of making it easy to obtain the full-size image, etc.

While this embodiment illustrates the case of using an electronic still camera or a video camera of the digital recording type, the embodiment can also be similarly realized in those cameras of the analog recording type.

As described above, the sixth embodiment is arranged such that additional information including distance information about an object, zoom information, etc. is recorded on a recording medium together with an image of the object, the additional information as well as the object image are read out in reproduction, and a scale factor is calculated from the additional information and output size information to display the scale factor of the object on the reproduced screen.

Accordingly, the scale factor of the reproduced image relative to the actual object can easily be recognized. When a desired scale factor is entered to instruct an output unit, electronic zooming and other processes are performed to enlarge or reduce the reproduced screen to the size as instructed so that the reproduced screen may be adjusted to the predetermined scale factor. Therefore, viewers looking at the image can easily confirm dimensions of the object with the result of remarkable advantages when utilized in presentation of commodities, for example.

What is claimed is:

1. A size display system for an electronic camera comprising:

image sensing system means for converting an image of an object focused on an image sensor through a lens system into an image signal;

focusing control means for obtaining zoom information and distance information in a state that the object image focused on said image sensor is under an in-focus condition;

a size display pattern generating circuit for generating a size display pattern including numeric characters;

a size display inserting circuit for inserting an output of said size display pattern generating circuit as an image signal;

control means for, in photographing, taking in the zoom information and the distance information obtained from said focusing control means, performing arithmetic operations to calculate size display data, outputting the size display pattern from said size display pattern generating circuit based on said size display data to thereby create an image signal of only the size display pattern to be recorded on a recording medium, and making correspondence between a recording area of said recording medium where said image signal of only the size display pattern is recorded and a recording area of said recording medium where said image signal of the object is recorded; and synthesis means for synthesizing images in plural recording areas of said recording medium with each other, wherein in reproducing the object image on a monitor or the like from said recording medium, the object image and the corresponding size display pattern can be synthesized and displayed, said synthesis means including size display pattern selecting means for selectively including the size display pattern with the displayed object image.

2. A size display system for an electronic still camera comprising:

image sensing systems means for converting an image of an object focused on an image sensor through a lens systems into an image signal;

lens and iris control means for obtaining in-focus information, zoom information, distance information and iris information about the object image focused on said image sensor;

Non Return to Zero writing means for making conversion into a Non Return to Zero signal;

a recording medium having a special region where a signal other than said image signal of the object is stored by being recorded with a Non Return to Zero recording technique;

a Non Return to Zero reading circuit for making inverse conversion of the Non Return to Zero signal;

select means for selecting whether the size display is to be made or not;

a scale display circuit for generating a scale pattern and numerical values for graduations; and control means having a function of calculating size display data based on said in-focus and iris information, causing said in-focus information, zoom information, distance information and iris information or said size display data to be the Non Return to Zero-converted by said Non Return to Zero writing means and recorded in the special region of said recording medium in photographing, and causing the contents of the special region of said recording medium to be read out and demodulated into the original signal format by said Non Return to Zero reading circuit in reproduction when size display is selected by said select means, whereby said size display data are sent to said scale display circuit to output the scale pattern and the numerical values for graduations therefrom so that the scale pattern and the numerical values for graduations are displayed on a reproduced screen of said image signal of the object read from the said recording medium in a superposed relation.

3. A size display system for an electronic still camera comprising:

image sensing system means for converting an image of an object focused on an image sensor through a lens system into an image signal;

lens and iris control means for obtaining in-focus information, zoom information, distance information and iris information abut the object image focused on said image sensor;

Non Return to Zero writing means for making conversion into a Non Return to Zero signal;

a recording medium having a special region where a signal other than said image signal of the object is stored by being recorded with a Non Return to Zero recording technique;

a Non Return to Zero reading circuit for making inverse conversion of the Non Return to Zero signal;

select means for selecting whether size display is to be made or not; a scale display circuit for generating a scale pattern and numerical values for graduations; and control means having a function of calculating size display data based on said in-focus information, zoom information, distance information and iris information, causing said size display data to be calculated based on said in-focus information, zoom information, distance information and iris information and also causing said scale display circuit to generate the scale pattern and the numerical values for graduations in photographing, so that the scale pattern and the numerical values for graduations are Non Return to Zero-converted by said Non Return to Zero writing means and recorded in the special region of said recording medium, and causing the contents of the special region of said recording medium to be read out and demodulated into the original signal format by said Non Return to Zero reading circuit in reproduction when size display is selected by said select means, whereby the scale pattern and the numerical values for graduations are output so that the scale pattern and the numerical values for graduations are displayed on a reproduced screen of said image signal of the object read from the said recording medium in a superposed relation.

4. A size display system for an electronic still camera according to any one of claims 2 and 3, wherein a queue track of a video floppy is used as the special region of said recording medium.

5. A size display system for an electronic still camera according to any one of claims 2 and 3, wherein the information recorded in the special region of said recording medium include not only in-focus information, zoom information, distance information and iris information, or size display information calculated based on said various kinds of information, but also an identification code, said identification code serving to discriminate whether scale display is to be made or not in a system apparatus.

6. A size display system for an electronic camera in which in-focus information, zoom information, distance information and iris information about an image of an object focused on an image sensor through a lens system are obtained to calculate size display data for displaying a scale pattern based on said calculated data together with the object image, comprising:

scale mode setting means operable for setting the camera to a scale mode in which a size display is produced;

AF range measuring area specifying means for specifying an AF range measuring area;

scale mode condition setting means for moving a zoom lens to a tele end, causing said AF range measuring area specifying means to make the AF range measuring area narrower than the range measuring area in normal photographing, and setting an iris to the full-open side, when the camera is set to a scale mode by said scale mode setting means; and control means for, when focusing operating is performed in a state of the scale mode being set, fixing a lens position to the in-focus position, making a shift to a photographing mode, and setting an iris to an auto-iris state and a zoom lens to a manually operable state, wherein the distance information among various kinds of information taken in during shutter release operation after setting the scale mode and performing the focusing operation is given by taking in information standing for the lens position at the time when fixed to said in-focus position.

7. A size display system for an electronic camera according to claim 6, wherein said object image and said scale pattern are recorded in a digital manner.

8. A size display system for an electronic camera comprising:

image sensing system means for converting an image of an object focused on an image sensor through a lens system into an image signal;

focusing control means for obtaining zoom information and distance information in a state that the object image focused on said image sensor is under an in-focus condition;

means for detecting positions of two measured points, captured in the same visual field, on a screen;

character and size pattern generating means for generating a size display pattern including numeric characters;

character and size pattern inserting means for inserting an output of said character and size pattern generating means as an image signal;

control means for obtaining distances up to said two measured points based on the distance information from said focusing control means to calculate the difference between those distances to thereby determine the distance between said two measured points, and calculating size display data based on the positions of said two measured points on the screen, the distance information and zoom information for generating the size display pattern between said two measured points, and sending the distance between said two measured points and the size display data to said character and size pattern generating means so that a numerical value indicating said distance, a unit and a size pattern signal are output from said character and size pattern generating means and recorded on a recording medium by said character and size pattern inserting means; and means for synthesizing said image signal of the object read out from said recording medium with the numerical value indicating said distance, the unit and size display pattern, wherein when size display is instructed, the numerical value indicating said distance, the unit and the size display pattern are displayed on a reproduced screen of the object.

9. A size display system for an electronic camera in which:

position information of two measured points on one or two objects captured in the same visual field, and zoom information and distance information in a state that the measured points are under an in-focus condition, are obtained from a zoom lens and a focus adjusting lens;

said various kinds of information are put in predetermined equations and subjected to arithmetic operation to calculate data for the size between said two measured points and a scale indicating the span therebetween;

said data for the size and the scale are sent to a scale pattern generator to output a numerical value indicating said size, a unit and a scale pattern; and the numerical value indicating said size, the unit and the scale pattern are displayed simultaneously with an object image during photographing or when a photographed image is reproduced, said size display system comprising control means for, when said two measured points on one or two objects are specified in a state of a size display mode being set, calculating said data for the size and the scale based on the position information as well as the zoom information and the distance information under an in-focus condition which are obtained for each of said two measured points, narrowing an aperture of an iris as small as possible in consideration of the relation of a shutter speed with respect to an EV value of the object, calculating a square root of the product of the distances up to said two measured points to determine the photographing distance, and performing a focus adjustment of said focus adjusting lens so that the focal length of the focus adjusting lens become equal to the photographing distance.

10. A size display system for an electronic camera according to any one of claims 8 and 9, wherein said object image and said size pattern are recorded in a digital manner.

* * * * *